United States Patent
Shimotoso

(10) Patent No.: US 8,220,759 B2
(45) Date of Patent: Jul. 17, 2012

(54) TERMINAL APPARATUS HAVING TILTING MECHANISM

(75) Inventor: Tadashi Shimotoso, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1052 days.

(21) Appl. No.: 12/158,938

(22) PCT Filed: Sep. 6, 2007

(86) PCT No.: PCT/JP2007/067781
§ 371 (c)(1),
(2), (4) Date: Jun. 23, 2008

(87) PCT Pub. No.: WO2008/050549
PCT Pub. Date: May 2, 2008

(65) Prior Publication Data
US 2009/0309002 A1 Dec. 17, 2009

(30) Foreign Application Priority Data
Sep. 25, 2006 (JP) .................................. 2006-258566

(51) Int. Cl.
*A47F 5/12* (2006.01)
*A45D 19/04* (2006.01)
*A47J 47/16* (2006.01)
*F16M 13/00* (2006.01)
*A47G 1/24* (2006.01)

(52) U.S. Cl. ........ 248/133; 248/397; 248/134; 248/454; 248/919; 248/917; 248/922; 248/923

(58) Field of Classification Search .................. 248/133, 248/397, 134, 917–923, 454, 291
See application file for complete search history.

(56) References Cited

U.S. PATENT DOCUMENTS
4,693,444 A * 9/1987 Williams et al. .............. 248/653
(Continued)

FOREIGN PATENT DOCUMENTS
GB 2 330 477 4/1999
(Continued)

OTHER PUBLICATIONS
International Search Report dated May 8, 2006.

*Primary Examiner* — Terrell McKinnon
*Assistant Examiner* — Christopher Garft
(74) *Attorney, Agent, or Firm* — Dickinson Wright PLLC

(57) ABSTRACT

A terminal apparatus includes a portion (12) having an operation portion, a pedestal (20) which holds the main-body base portion (12) so as to be tiltable, a hook (31) which fixes the main-body base portion (12) in a tilting state at plural predetermined angles, a tooth row (224) which has teeth and engages with the hook (31) to fix the main-body base portion (12) in the tilting state at plural predetermined angles, a cam (33) which moves within the main-body base portion (12) in accordance with the tilt angle of the main-body base portion (12), and a cam control groove (226) which controls the movement of the cam (33), wherein when the hook (31) moves over the tooth at the uppermost step of the tooth row (224), the hook rides on the cam (33) thereby to release the engagement with the tooth row (224), then the hook moves downward in a state of riding on the cam (33), then the main-body base portion (12) releases the tilting and moves downward to restore to an initial position.

11 Claims, 18 Drawing Sheets

U.S. PATENT DOCUMENTS

| | | | |
|---|---|---|---|
| 5,187,743 A * | 2/1993 | Gumb et al. | 379/436 |
| 5,710,415 A * | 1/1998 | Kono et al. | 235/7 R |
| 5,791,621 A * | 8/1998 | Yashima | 248/371 |
| 6,019,338 A * | 2/2000 | Brown et al. | 248/371 |
| 6,122,370 A | 9/2000 | Westfall | |
| 6,215,869 B1 * | 4/2001 | Frank et al. | 379/428.01 |
| 6,351,535 B1 * | 2/2002 | Nogas et al. | 379/436 |
| 6,354,552 B1 * | 3/2002 | Chiu | 248/422 |
| 6,407,909 B1 * | 6/2002 | Kato et al. | 361/679.27 |
| 6,445,793 B1 * | 9/2002 | Vassallo et al. | 379/428.01 |
| 7,216,401 B2 * | 5/2007 | Bae | 16/324 |
| 2005/0069126 A1 | 3/2005 | Xue | |
| 2005/0207112 A1 * | 9/2005 | Bakker et al. | 361/686 |
| 2006/0198094 A1 * | 9/2006 | Kano et al. | 361/683 |

FOREIGN PATENT DOCUMENTS

JP    2002-190854    7/2002

* cited by examiner

FIG. 1
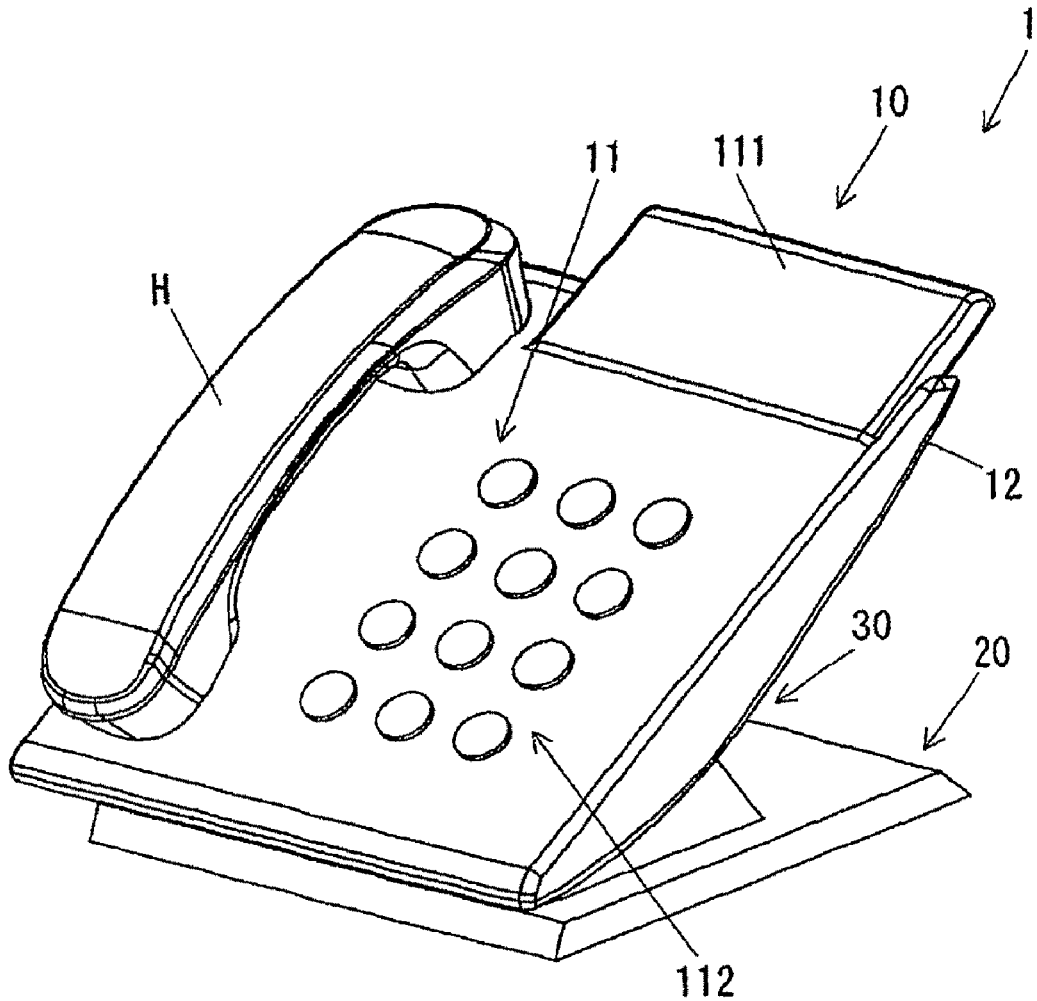
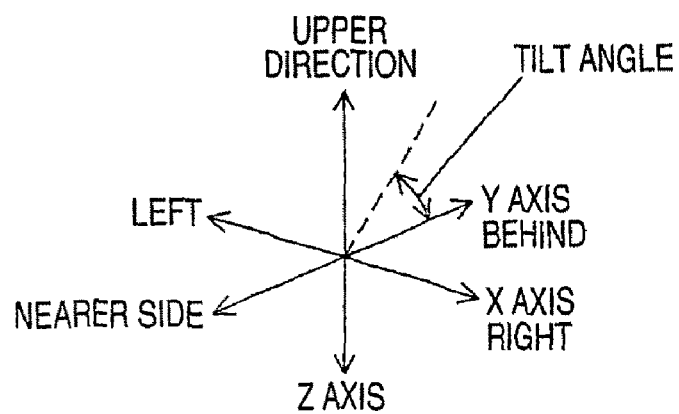

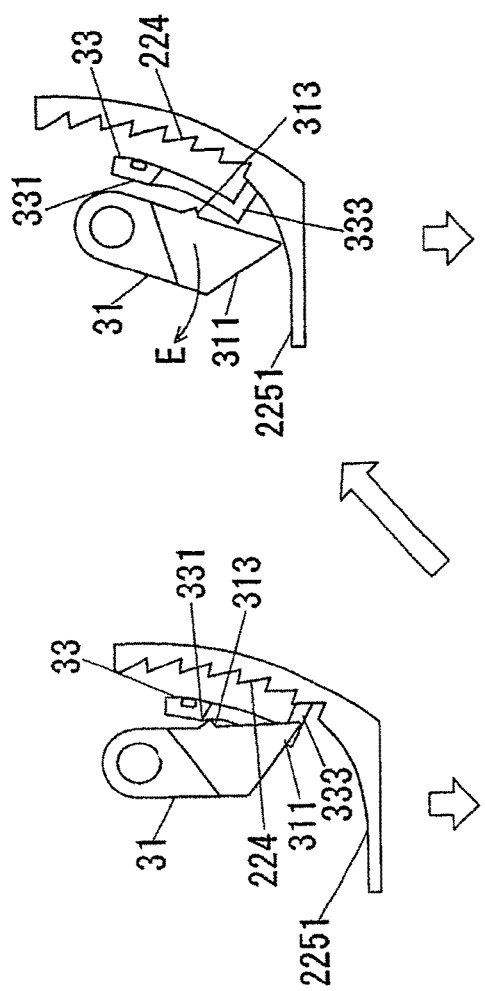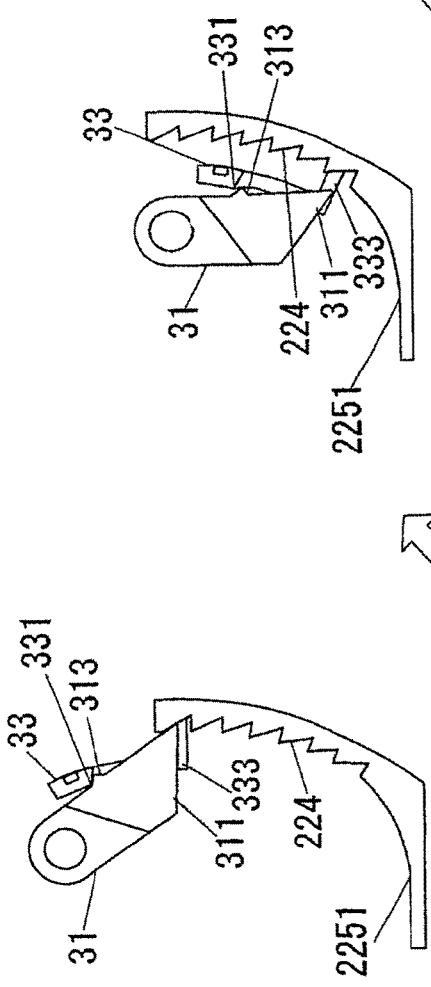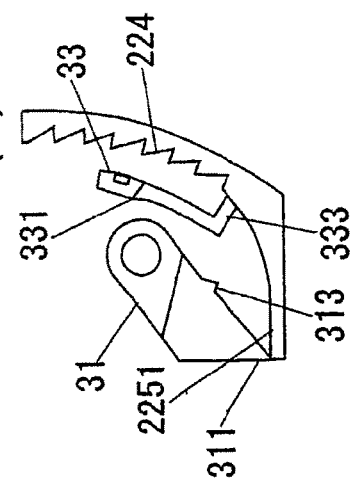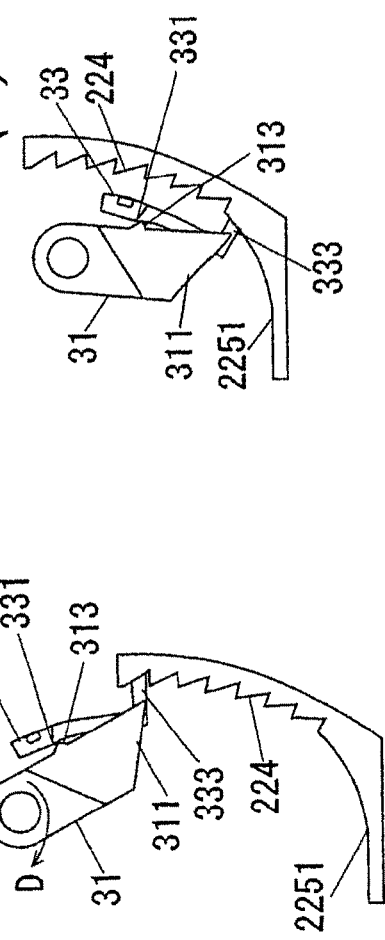

TERMINAL APPARATUS HAVING TILTING MECHANISM

TECHNICAL FIELD

The present invention relates to a terminal apparatus and, in particular, relates to a terminal apparatus which is improved in its operability so that the terminal is disposed on a table or a wall and is operated to display or operated.

BACKGROUND ART

As a communication terminal apparatus as an example of the terminal apparatus, there is one which is configured by combining a supporting member serving as a pillar and a guide member for determining a slanted angle in order to constitute an operation panel portion so as to be tiltable (see JP-A-2002-190854, for example).

In the terminal apparatus, the operation panel portion is required to have improved operability so that the portion can be set to a desired tilt with a more simple operation. Further, the tilt angle is required to be set more finely.

DISCLOSURE OF INVENTION

Accordingly, an object of the invention is to provide a terminal apparatus in which an operation panel portion can be easily set to a desired tilt.

A terminal apparatus according to the invention is characterized by including: a main body having an operation portion; a pedestal which holds the main body so as to be tiltable; a hook which is provided on the main body side and fixes the main body to the pedestal in a tilting state at plural predetermined angles; a tooth row which is provided on the pedestal side, has teeth and engages with the hook to fix the main body to the pedestal in a tilting state at plural predetermined angles; a cam which is provided on the main body side and moves within the main body in accordance with a tilt angle of the main body; and a cam control groove which is provided in parallel to the tooth row and along which the cam moves, wherein when the hook moves over a tooth at an uppermost step of the tooth row, the hook rides on the cam thereby to release an engagement with the tooth row, then the hook moves downward in a state of riding on the cam, then the main body releases a tilting state and moves downward to restore to an initial position with respect to the pedestal.

According to the invention, since an operator can adjust the angle by merely tilting the main body, it is possible to provide a terminal apparatus in which an operation panel portion can be easily set to a desired tilt.

BRIEF DESCRIPTION OF DRAWINGS

FIG. 1 is a perspective view of a telephone apparatus according to the first embodiment of the invention.

FIGS. 15(A) to 15(F) are diagrams for explaining a process rerunning from the tilt release position to the initial position.

BEST MODE FOR CARRYING OUT THE INVENTION (First Embodiment)

Figure 2:
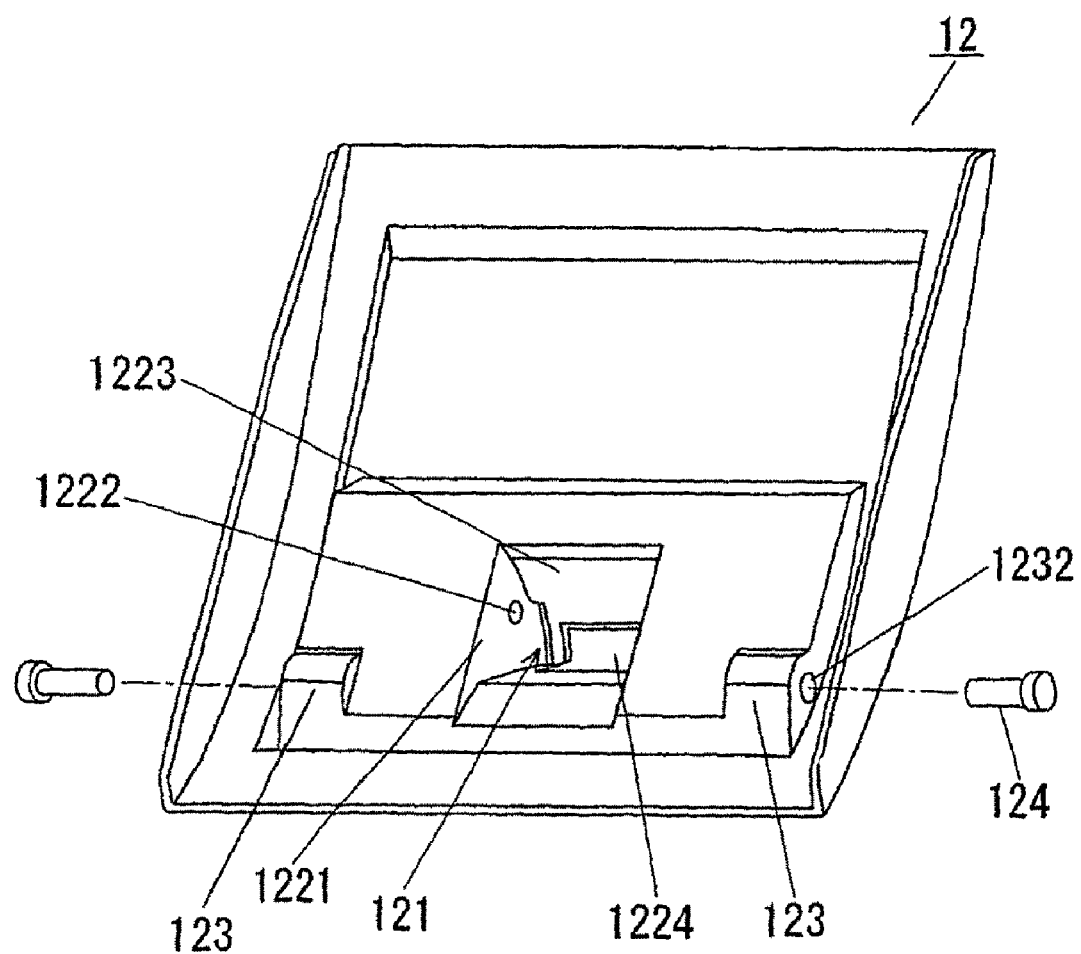
FIG. 2 is a diagram for explaining the inner portion of the base portion of a main body of FIG. 1.
Figure 3:
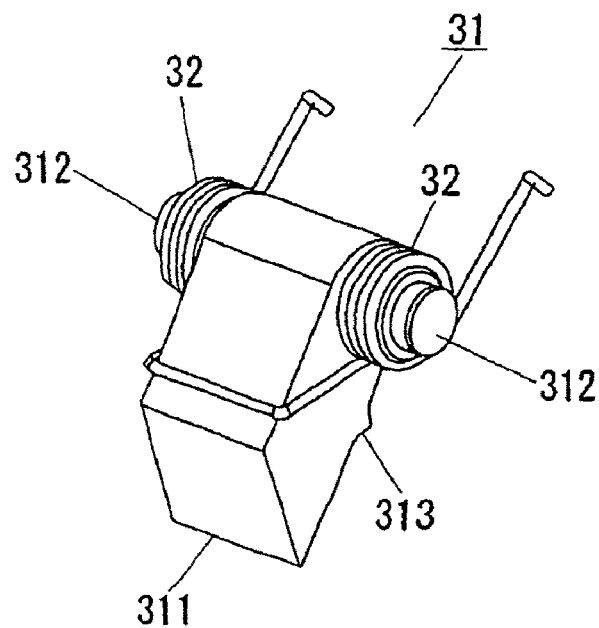
FIG. 3 is a perspective view for explaining a state where a torsion coil spring is attached to a hook.
Figure 4:
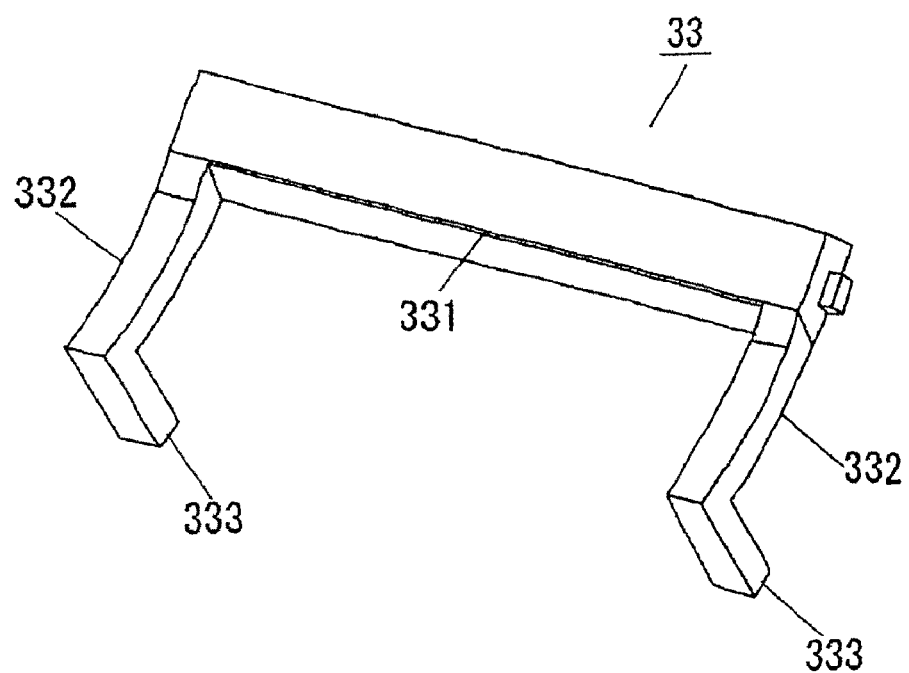
FIG. 4 is a perspective view for explaining a cam.

The terminal apparatus according to the first embodiment of the invention will be explained with reference to FIGS. 1 to 10. FIG. 1 is a perspective view of a telephone apparatus according to the first embodiment of the invention, FIG. 2 is a diagram for explaining the inner portion of the base portion of a main body of FIG. 1, FIG. 3 is a perspective view for explaining a state where a torsion coil spring is attached to a hook, and FIG. 4 is a perspective view for explaining a cam.

Figure 5:
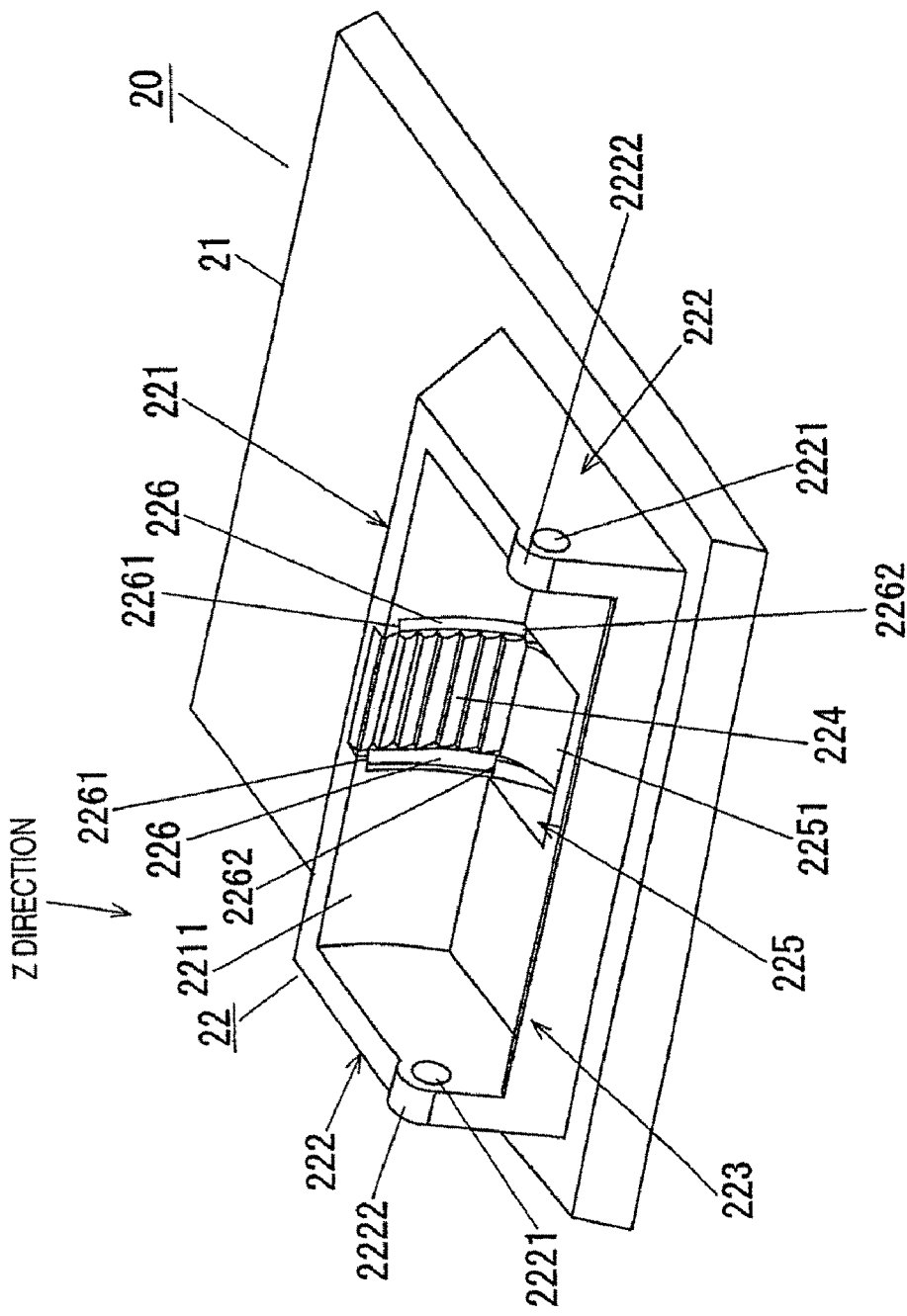
FIG. 5 is a perspective view for explaining the inner portion of a pedestal of FIG. 1.
Figure 6:
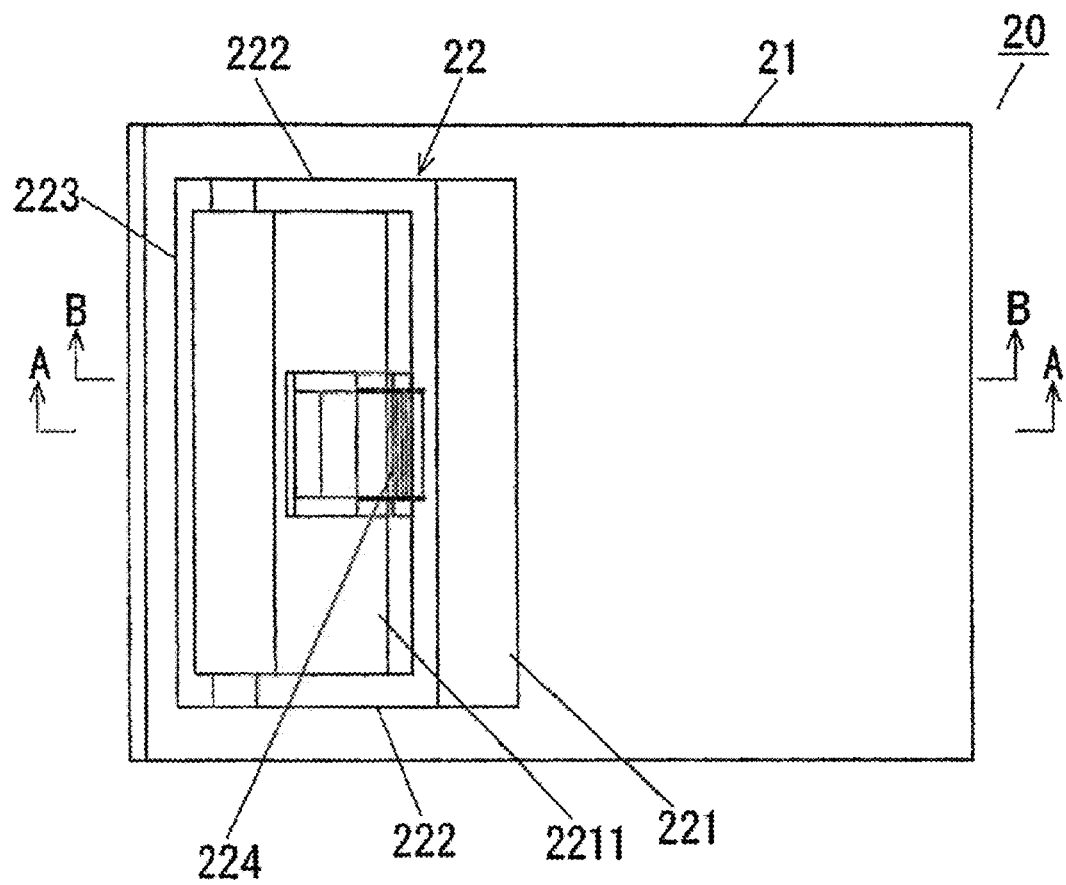
FIG. 6 is a diagram seen from a Z-direction in FIG. 5.
Figure 7A:
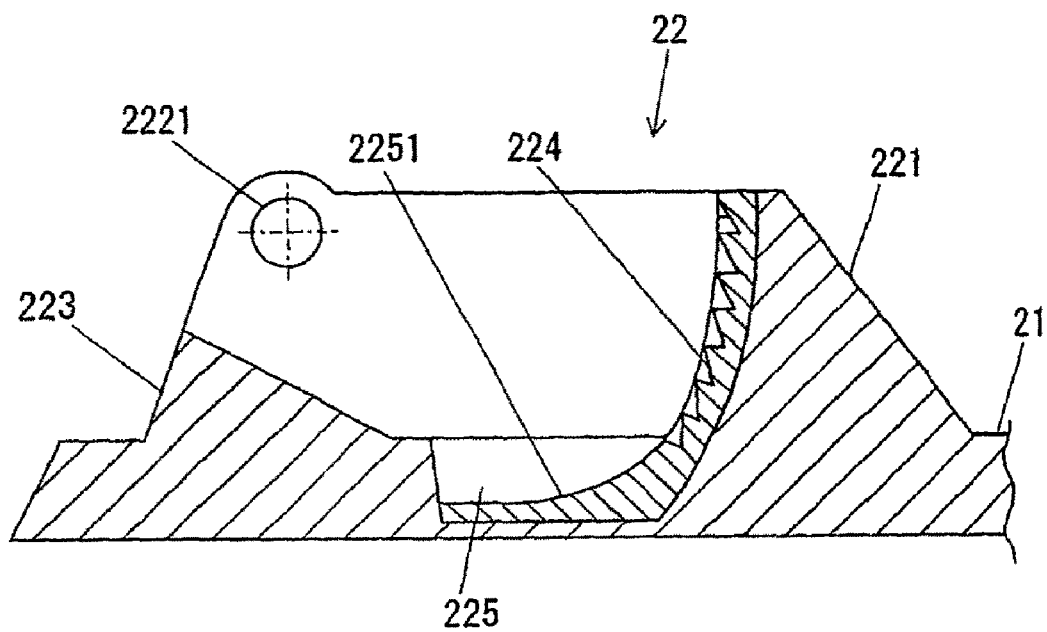
FIGS. 7(A) and 7(B) are sectional diagrams of the main portion in FIG. 6.
Figure 7B:
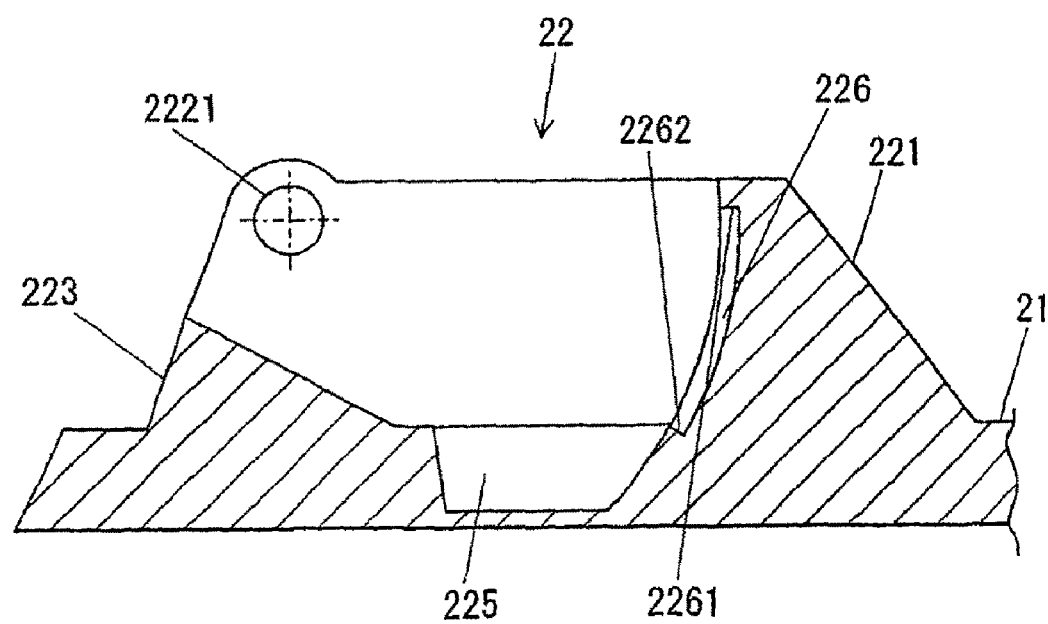

FIG. 5 is a perspective view for explaining the inner portion of a pedestal of FIG. 1, FIG. 6 is a diagram seen from a Z-direction in FIG. 5, and FIG. 7 show sectional diagrams of the main portion in FIG. 6, in which FIG. 7(A) is a sectional diagram cut along a line A-A in FIG. 6 and is a diagram for explaining a tooth row, and FIG. 7(B) is a diagram cut along a line B-B in FIG. 6 and is a diagram for explaining a cam control groove.

Figure 8:
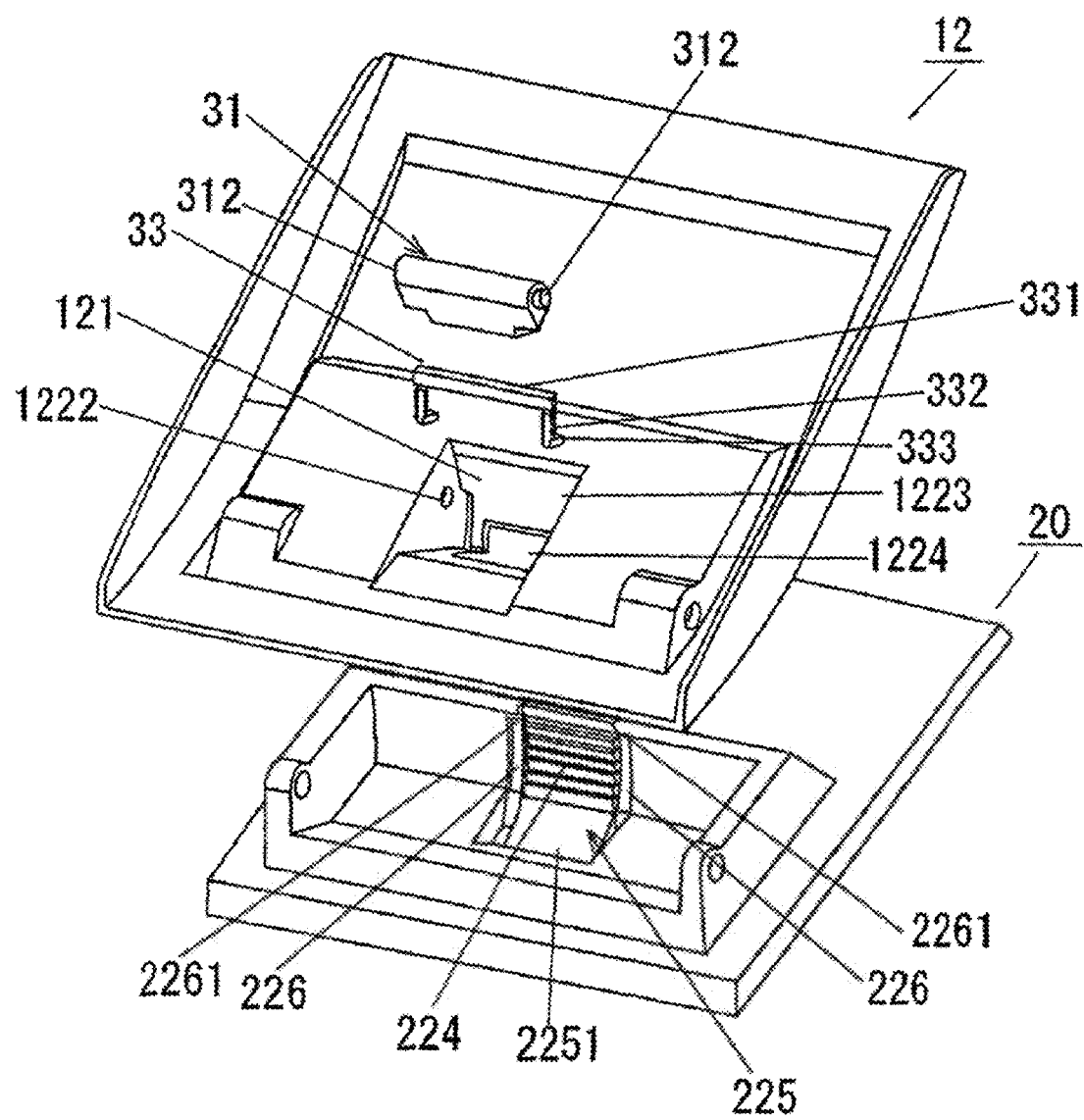
FIG. 8 is an exploded perspective view of FIG. 1.
Figure 9:
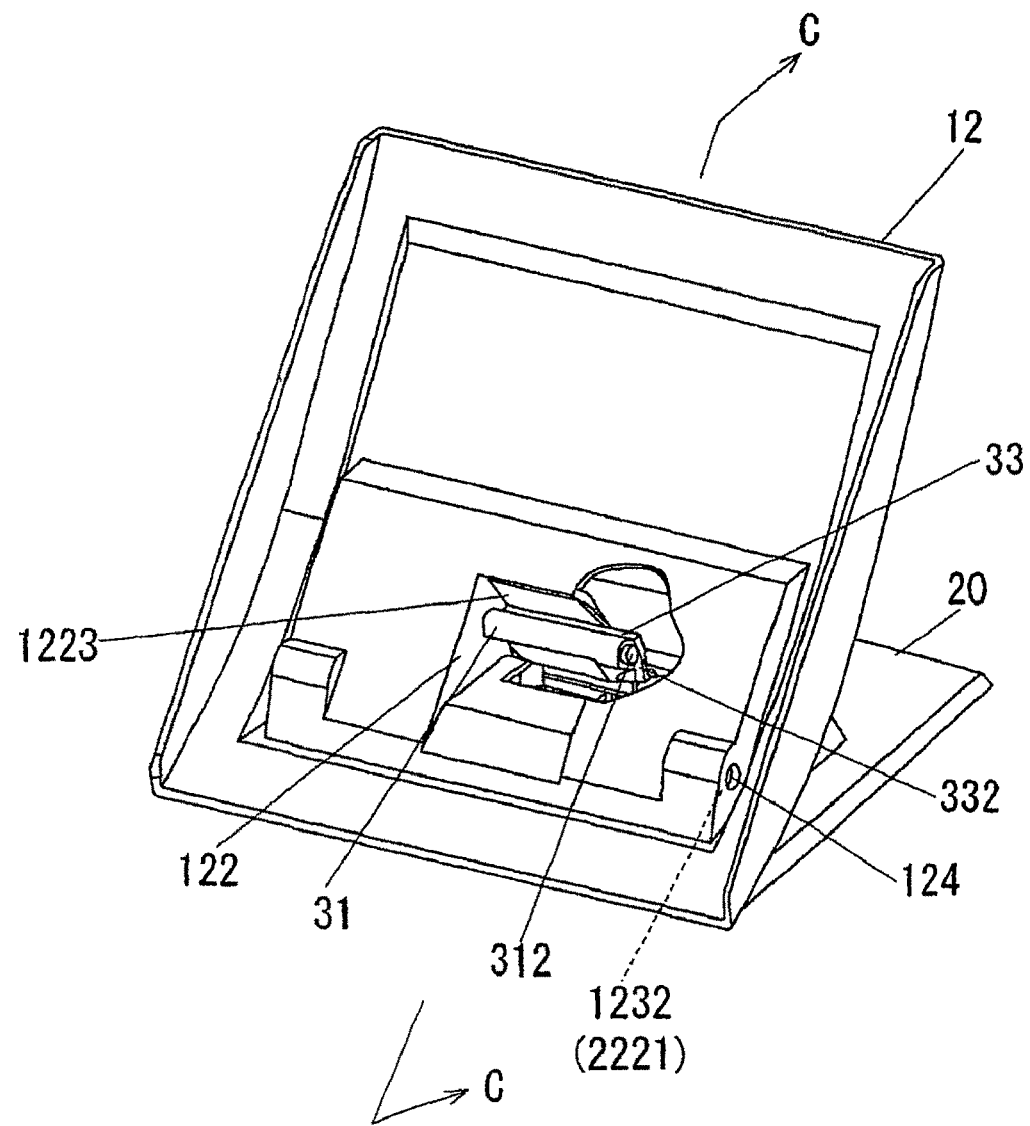
FIG. 9 is a diagram for explaining an engagement state between the main-body base portion and the pedestal.
Figure 10:
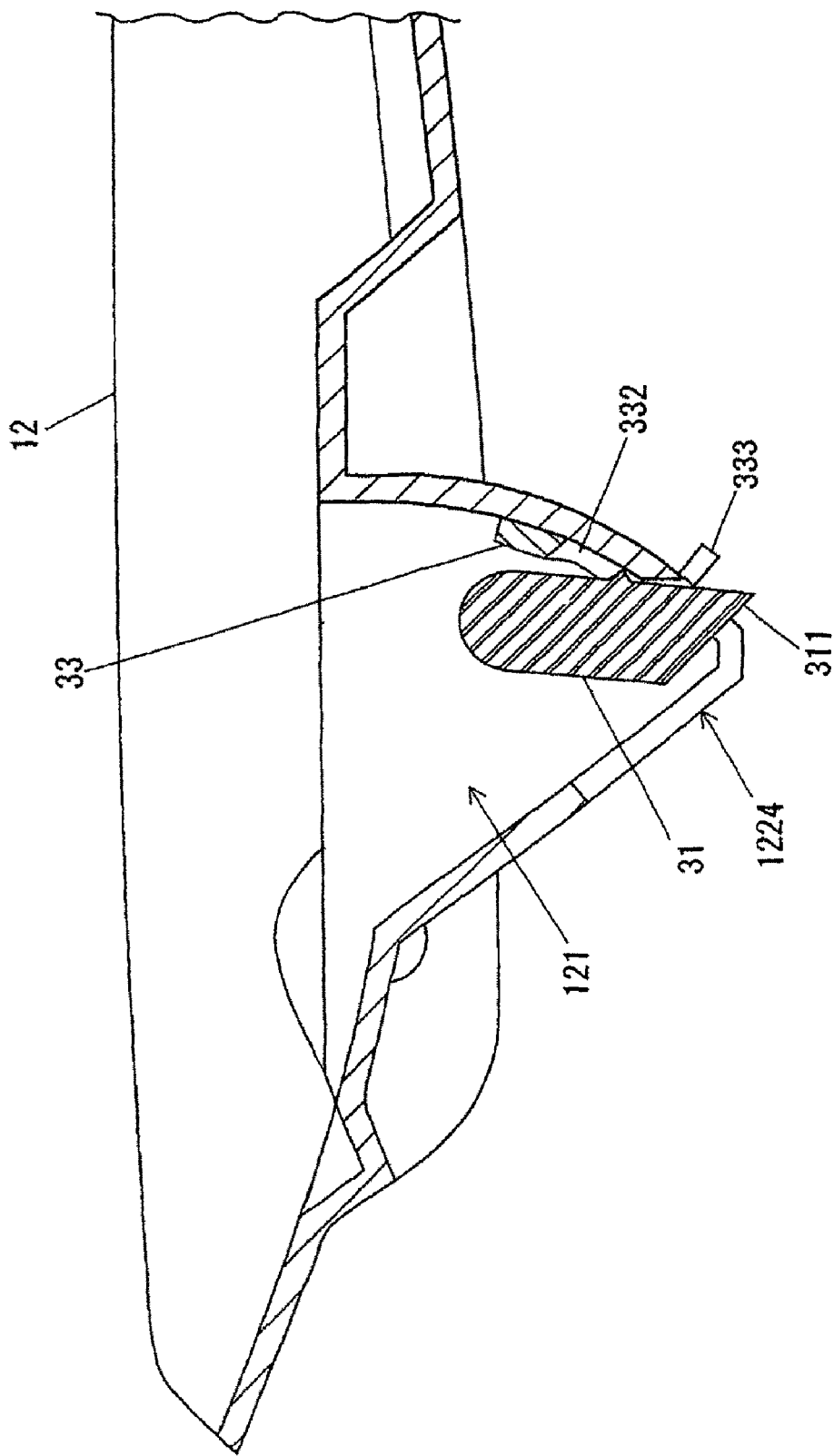
FIG. 10 is a diagram cut along a line C-C in FIG. 9.

FIG. 8 is an exploded perspective view for explaining an engagement state between the main-body base portion and the pedestal. FIG. 9 is a diagram for explaining the engagement state between the main-body base portion and the pedestal, and FIG. 10 is a diagram cut along a line C-C in FIG. 9 and is a diagram for explaining a state where the nail portion of the hook and the engagement portion of a cam arm portion protrude from the projection hole of the main-body base portion. Incidentally, for the sake of the simplification, a wiring for coupling a handset H and an apparatus main body 10 is omitted in FIG. 1. Similarly, a torsion coil spring 32 is omitted in FIG. 8.

In FIG. 1, the telephone apparatus 1 includes the apparatus main body 10 in which a telephone function is contained, a pedestal 20 for supporting the apparatus main body 10 and a ratchet portion 30 for supporting the body so that the tilt angle of the apparatus main body 10 with respect to the pedestal 20 is changeable. Further, FIG. 1 shows coordinates. An X-coordinate represents right and left directions and a Y-coordinate represents the depth (an operation side is nearer side in the figure) in view of a case where an operator operates the telephone apparatus 1. A Z-coordinate represents a vertical direction, and the upper side in the paper represents the upper direction. A flat plane formed by the X- and Y-axes is a plane on which the pedestal 20 is placed and is a horizontal plane such as a table. On the other hand, a flat plane formed by the X-axis and a Z-axis is a vertical plane and is explained hereinafter as a wall surface or a hanging wall.

A dotted line shown between the X-axis and the Z-axis represents a tilt angle with respect to the Y-axis serving as a basic point, which corresponds to the tilt angle of the apparatus main body 10. To be concrete, the inclination of the apparatus main body 10 to the upper direction results in the increase of the tilt angle. In contrast, the lowering the apparatus main body 10 results in the reduction of the tilt angle. Placing the apparatus main body 10 along the horizontal direction means that the apparatus main body 10 is placed in parallel to the pedestal 20 and so the angle (inclination angle) with respect to the Y-axis becomes almost zero.

The body is formed almost in a rectangular parallelepiped shape and is provided with an operation panel portion 11 at the front face opposing to an operator and provided with a main-body base portion 12 for housing a circuit board having a telephone function at another face of the boxed shaped configuration. A handset H is disposed on the left side of the operation panel portion 11. The operation panel portion 11 is provided with a display portion 111 for displaying various information such as a telephone number, the time and a talk time and an operation key portion 112 at which numeral keys, function keys etc. are arranged. A liquid crystal display panel can be used as the display portion 111.

In FIG. 2, the bottom surface of the main-body base portion 12 is formed so as to protrude gently downward. At the center portion of the bottom surface, a bottom space portion 121 is formed which has a vertical section of an almost triangular shape and is protruded toward the pedestal 20. The bottom space portion 121 forms a bottom side portion 1221 and a main-body arc-shaped peripheral surface 1223. The bottom side portion 1221 is provided with a rotation hole 1222 for rotatably supporting a hook described later. The main-body arc-shaped peripheral surface 1223 is provided at the bottom portion thereof with a projection hole 1224 for protruding the hook and a cam described later therefrom.

Further, the main-body base portion 12 is provided at the left and right portions of the bottom surface thereof with main-body bearing portions 123 so as to sandwich the bottom space portion 121 from the left and right sides thereof, respectively. The main-body bearing portion 123 forms a main-body swingable hole 1232. On the other hand, the pedestal 20 is also provided with a pedestal swingable hole 2221. The main-body swingable hole 1232 and the pedestal swingable hole 2221 are interlocked by a swingable shaft 124. In this manner, the main-body base portion 12 is interlocked with the pedestal 20 so as to be swingable (that is, tiltable). Thus, the main-body arc-shaped peripheral surface 1223 is formed so as to form a part of a cylindrical peripheral surface around the swingable shaft 124.

The swingable shaft 124 is formed by resin like the main-body base portion 12 and the pedestal 20. Further, the swingable shaft 124 may be formed by metal material, whereby the swingable shaft can be configured to have a structure highly durable with respect to impact and abrasion. Alternatively, the swingable shaft 124 and one of the main-body swingable hole 1232 and the pedestal swingable hole 2221 may be formed integrally. The swingable shaft 124 thus formed integrally may be fit into the other hole (the main-body swingable hole 1232 or the pedestal swingable hole 2221 not having been integrally formed) by utilizing the elasticity of the resin, whereby the number of parts can be reduced and so the apparatus can be configured cheaply.

In FIG. 3, a hook 31 is configured in a shape being ramified in an almost T-shape from the main body portion thereof. The tip end portion of the hook 31 (bottom end of T-shape) constitutes a nail portion 311. The nail portion 311 is formed in a triangular prism shape and has a function of engaging with a tooth row 224 described later. Each of the left and right end portions of the hook 31 (sleeve of T-shape) is formed as a hook shaft 312. The hook shaft 312 is pivotally attached to the rotation hole 1222 formed at the bottom space portion 121 described above. When the hook 31 rotates around the hook shaft 312, the main body portion of the hook 31 (the nail portion 311) approaches or separates from the main-body arc-shaped peripheral surface 1223.

A hook abutment portion 313 is provided at a portion of the main body portion which approaches the main-body arc-shaped peripheral surface 1223. The hook abutment portion 313 is a portion which abuts against a cam 33 described later. The hook abutment portion 313 is formed to have a section of an almost triangular shape so that the hook 31 abutting against the cam 33 rotates effectively. The shape of the hook abutment portion 313 is designed so as to effectively set the timing and the operation range of the rotation operation of the hook 31. The section of an almost triangular shape is mere example of the first embodiment and, of course, it should be understood that the shape of the hook abutment portion is not limited thereto.

Each of the hook shaft 312 is provided with a torsion coil spring 32. The one end of the torsion coil spring 32 is bridged to the predetermined position of the bottom space portion 121 (for example, the hole provided at the main-body arc-shaped peripheral surface 1223 or the edge portion of the projection hole 1224) and the other end thereof is bridged to the main body portion of the hook 31. The torsion coil spring 32 urges the hook 31 toward the tooth row 224, and so the nail portion 311 protruded from the projection hole 1224 is pushed and biased so as to engage with the tooth row 224. That is, the torsion coil spring 32 functions as a biasing member. Since the torsion coil spring 32 is disposed at the hook shaft 312, the space can be saved. The biasing force can be adjusted easily by suitably adjusting the strength of the torsion coil spring 32.

In FIG. 4, the cam 33 has a structure that a cam abutment portion 331 of a quadratic prism shape is coupled to cam arm portions 332 each having an almost L-shape provided at the both end portions of the cam abutment portion 331 thereby to form in an almost U-shape as a whole. The almost L-shaped portion of the cam arm portion 332 forms a cam engagement portion 333 for engaging with the pedestal 20. The cam abutment portion 331 slidably moves on the main-body arc-shaped peripheral surface 1223.

Each of the main-body arc-shaped peripheral surface 1223 and the surface of the cam abutment portion 331 is processed (surface processing) so that suitable friction arises between the main-body arc-shaped peripheral surface 1223 and the cam abutment portion 331. The cam abutment portion 331 slides with such a degree of friction resistance that the cam abutment portion 331 does not freely slide down along the main-body arc-shaped peripheral surface 1223. When the cam abutment portion 331 slidably moves along the main-body arc-shaped peripheral surface 1223, each of the cam engagement portions 333 moves in a manner that the cam engagement portion protrudes toward the pedestal 20 from an opening portion continuing to the projection hole 1224. An opening hole may be provided separately as a protrusion hole for each of the cam engagement portions 333.

The cam abutment portion 331 has a function of abutting against the hook abutment portion 313 when slidably moving along the main-body arc-shaped peripheral surface 1223.

Since the tilt angle at the time of the abutment (the position and the timing at the time of the slidable movement) largely influences on the rotation operation of the hook 31, the tilt angle of the cam abutment portion 331 is formed suitably together with the sectional triangular shape of the hook abutment portion 313 so that the hook 31 rotates effectively.

When the hook abutment portion 313 abuts against the cam abutment portion 331, the hook 31 is applied with a suitable pressing biasing force by the torsion coil spring 32 and so the hook 31 abuts against the cam 33 and rides on the cam 33.

The hook 31, the biasing member of the hook 31 and the cam 33 housed within the bottom space portion 121 described above are collectively referred as a main-body ratchet unit.

In FIGS. 5 and 6, the pedestal 20 is configured by integrally forming a base portion 21 as a flat plate and a pedestal supporting portion 22 provided at the nearer side of the base portion 21. The pedestal supporting portion 22 is formed at a space portion of a box shape surrounded by a rear portion 221 on the far side of an operator, left and right side portions 222 and a front portion 223. Pedestal swingable holes 2221 are formed at the nearer portions of the left and right side portions 222, respectively. The swingable shaft 124 (see FIG. 2) is fit into the pedestal swingable holes 2221 together with the main-body swingable holes 1232 (see FIG. 2) thereby to attach the apparatus main body 10 to the pedestal 20 so as to be swingable freely. The peripheral portion of the pedestal swingable hole 2221 is a bearing portion 2222 which is secured with a sufficient intensity with respect to the tilting operation of the apparatus main body 10 and functions as a pedestal bearing.

In FIGS. 5 and 7, the inside measurement surface of the rear portion 221 of the pedestal supporting portion 22 is a pedestal arc-shaped peripheral surface 2211 formed so as to form a part of a cylindrical peripheral surface around the swingable shaft 124. In this manner, the main-body base portion 12 (in particular, the main-body arc-shaped peripheral surface 1223 and the main body ratchet unit) swingably operates (tilting operation) with respect to the pedestal 20 is disposed so as to oppose to the pedestal arc-shaped peripheral surface 2211.

At the center portion in the left and right directions of the pedestal arc-shaped peripheral surface 2211, the tooth row 224 is provided which has teeth each formed in a sawtooth shape and arranged along the pedestal arc-shaped peripheral surface 2211. Thus, the tip end portions of the tooth row 224 are aligned along the pedestal arc-shaped peripheral surface 2211. The shape of the sawtooth of the tooth row 224 is arranged in a manner that the nail portion 311 moves along the slanted surface of the sawtooth when the main-body base portion 12 moves so that the tilt angle thereof becomes larger, while the nail portion 311 moves along the horizontal surface of the sawtooth when the main-body base portion 12 moves downward. In the case of the tooth row 224 according to the first embodiment exemplarily shown in FIG. 7, since the number of the teeth is seven and the number of the horizontal surfaces is 8, it represents that it is possible to set to the horizontal state and seven steps of the tilt angle.

The pedestal supporting portion 22 is molded by resin integrally with the pedestal 20 as a part of the entire pedestal 20. On the other hand, each of the tooth row 224 and a cam control groove 226 described later is required to be finished accurately and further required to have a sufficient surface abrasion resistance since the tooth row 224 is subjected to repetitive abrasion. Thus, both the tooth row 224 and the cam control groove 226 may be formed by material excellent in the abrasion resistance and may be fit into the pedestal arc-shaped peripheral surface 2211.

Further, the downwardly extended surface of the tooth row 224 forms a recess portion 225 which is formed at a curved surface 2251 continued along the pedestal arc-shaped peripheral surface 2211. The curved surface 2251 is formed on an extended line of an envelope which contacts to the tops of the teeth of the tooth row 224. This is because to ensure the smooth rotation of the hook 31 when the hook 31 moves lower than the tooth row 224. The space portion of the recess portion 225 is provided in order to secure a housing space for the main body ratchet unit when the apparatus main body 10 is placed horizontally and also in order to secure a housing space compliant with a case of using by being hung on a wall as explained in a second embodiment.

In FIGS. 6 and 7, the cam control grooves 226 are provided at left and right sides of the tooth row 224, respectively. When the apparatus main body 10 tilts, the cam engagement portion 333 protrudes from the projection hole 1224 (opening portion) toward the pedestal 20 and moves together with the apparatus main body 10. In this case, the cam control grooves 226 function as a guide groove for the cam engagement portion 333.

According to this configuration, since the cam control grooves 226 locate at the both sides of the tooth row 224, the cam control grooves 226 can preferably maintain the balance of the cam 33 in the left and right directions in the engagement operation between the hook 31 and the tooth row 224 and the operation where the hook 31 rides on the cam 33. Thus, the engagement operation of the cam 33 can be stabilized.

Further, the cam control groove 226 is provided with an upper engagement portion 2261 for restricting the uppermost movement of the cam 33 when the apparatus main body 10 is raised. In this case, even if the apparatus main body 10 is raised so as to increase the tilt angle, the cam engagement portion 333 engages with the upper engagement portion 2261 and so the cam 33 stops at the upper engagement portion 2261.

On the other hand, the cam control groove 226 is provided with a lower engagement portion 2262 for restricting the lowermost movement of the cam 33 when the apparatus main body 10 is restored to the horizontal state. In this case, even if the apparatus main body 10 is restored to the horizontal state or tilted reversely in order to use by being hung on a wall, the cam engagement portion 333 engages with the lower engagement portion 2262 and so the cam 33 stops at the lower engagement portion 2262. The upper engagement portion 2261 and the lower engagement portion 2262 close both ends of the cam control groove 226 to restrict the movement of the cam 33. That is, the cam 33 moves within the apparatus main body 10 in accordance with the tilt angle of the apparatus main body 10.

The pedestal arc-shaped peripheral surface 2211, the tooth row 224 and the cam control grooves 226 are collectively referred as a pedestal ratchet unit. Further, the pedestal ratchet unit and the main-body ratchet unit are collectively referred as the ratchet portion 30.

As explained in detail, according to the invention, since the mechanism such as the tooth row 224 and the hook 31 are housed within a casing (the ratchet portion 30), it is not required to provide a pillar for determining the tilt angle or an operation lever. Thus, a telephone terminal apparatus which has a simple appearance and the thin main body can be obtained.

In FIG. 8, the explanation will be made as to the positional relation among the main-body base portion 12, the pedestal 20, the hook 31 and the cam 33 in the aforesaid explanation. First, the cam 33 is fit into the projection hole 1224 of the body 12. Then, the hook shaft 312 of the hook 31 is pivotally attached to the rotation hole 1222 of the body 12 and the torsion coil spring 32 is hooked at the predetermined position of the bottom space portion 121. The swingable shaft 124 is fit into the pedestal swingable holes 2221 and the main-body swingable holes 1232 of the main-body base portion 12 this prepared, whereby the main-body base portion 12 is pivotally attached to the pedestal 20 so as to be rotatable with respect to the pedestal 20.

In FIG. 9, in order to explain the engagement state of the main-body base portion 12 and the pedestal 20, the bottom space portion 121 is partially broken so that the pedestal supporting portion 22 can be seen. Further, the prepared state of the main-body base portion 12 will be explained by a sectional diagram cut along a line C-C in FIG. 9.

In FIG. 10, the cam 33 is housed within the bottom space portion 121 of the main-body base portion 12 in a state that the cam arm portion 332 is directed downward. When the cam engagement portion 333 at the tip end of the cam arm portion 332 protrudes from the projection hole 1224 of the bottom space portion 121 thereby to engage the main-body base portion 12 with the pedestal 20, the cam engagement portion 333 engages with the cam control groove 226 of the pedestal supporting portion 22 (see FIG. 5).

Since the suitable abrasion exists between the main-body arc-shaped peripheral surface 1223 and the cam abutment portion 331, in the tilt range where the tilt angle of the main-body base portion 12 is adjustable, the cam 33 moves along the slope (relative movement with respect to the pedestal 20) in accordance with the tilt of the body 12, and the cam 33 does not slide on the main-body arc-shaped peripheral surface 1223.

On the other hand, in the tilt range where the main-body base portion 12 exceeds the uppermost tilt step or the main-body base portion locates in a range from the lowermost tilt step to the initial position, the protruded cam engagement portion 333 engages with the upper engagement portion 2261 or the lower engagement portion 2262 of the cam control groove 226. Thus, the cam 33 stops the movement (the relative movement against the pedestal 20) and so the cam 33 slidably moves along the main-body arc-shaped peripheral surface 1223 even if the main-body base portion 12 moves along the slope. That is, the cam 33 moves and stops within the apparatus main body 10 in accordance with the tilt angle of the apparatus main body 10.

The hook 31 is attached in a state where the hook shaft 312 is inserted into the rotation hole 1222 of the bottom space portion 121 and the torsion coil spring 32 (not shown) is hooked at the hole provided at the main-body arc-shaped peripheral surface 1223. The hook 31 is biased toward the main-body arc-shaped peripheral surface 1223 by the pushing and biasing force of the torsion coil spring 32. That is, the nail portion 311 of the hook 31 is placed in a state of being protruded from the projection hole 1224 like the cam engagement portion 333. When the main-body base portion 12 engages with the pedestal 20, the protruded nail portion 311 is biased toward the tooth row 224 of the pedestal arc-shaped peripheral surface 2211 and engages with the tooth row 224.

Figure 11A:
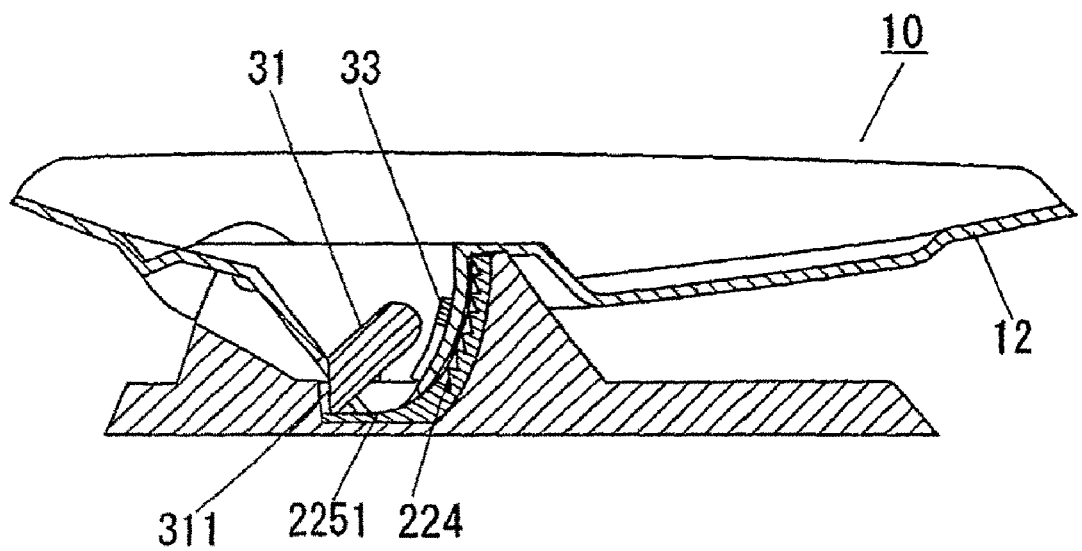
FIGS. 11(A) and 11(B) are sectional diagrams showing an initial position.
Figure 11B:
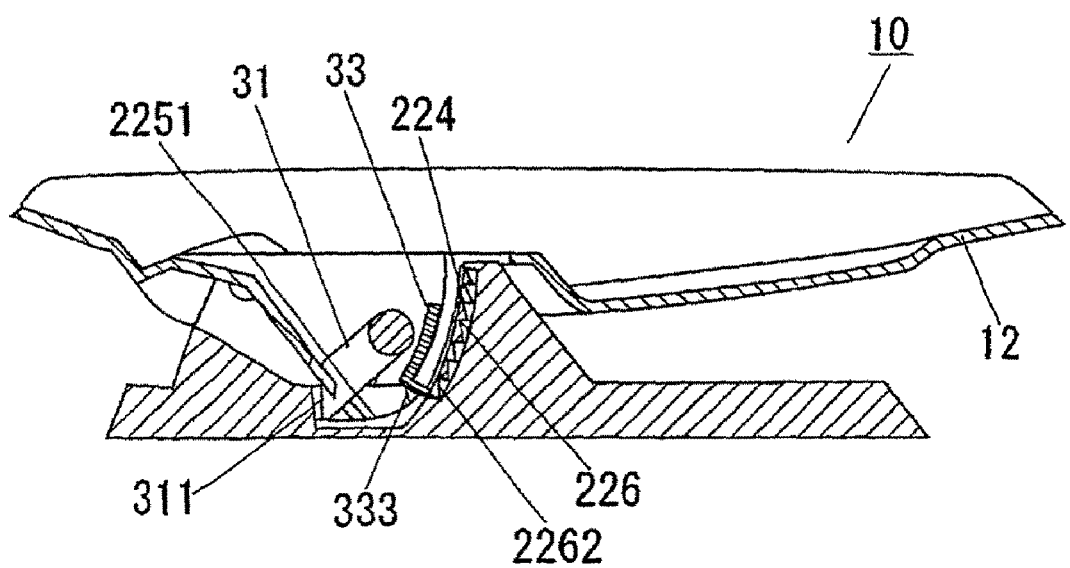

The using state of the telephone apparatus 1 according to the first embodiment of the invention configured in the aforesaid manner will be explained with reference to the drawings. FIG. 11 is sectional diagrams showing the initial position, wherein FIG. 11(A) is a diagram showing the position of the hook and FIG. 11(B) is a diagram showing the position of the cam. The sectional positions represented by A and B respectively represent the same positions as FIGS. 6 and 7 in the same order, which applies to the sectional diagrams explained below.

Figure 12A:
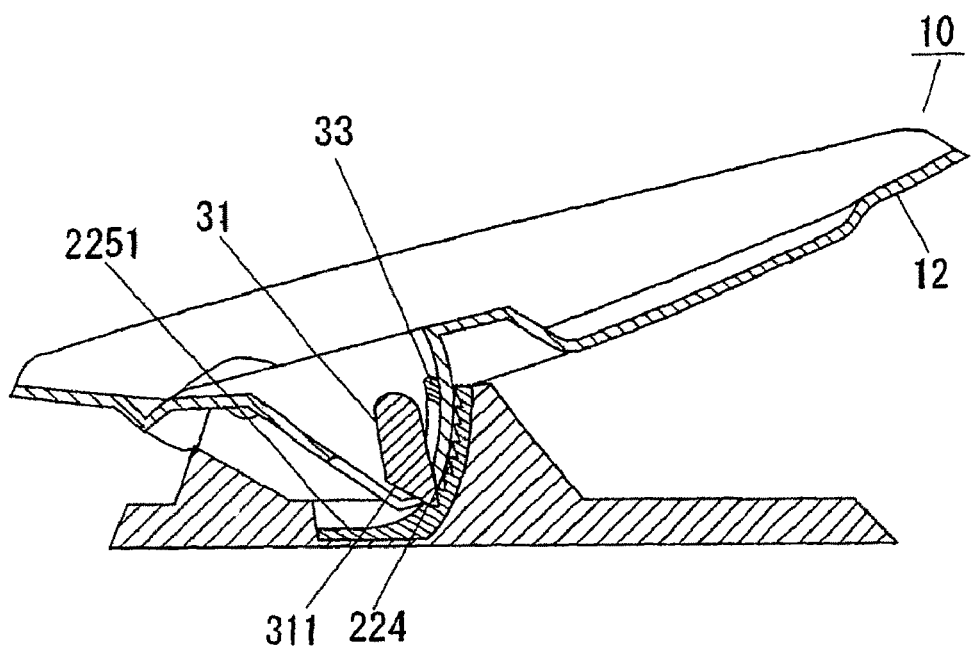
FIGS. 12(A) and 12(B) are sectional diagrams showing the lowermost tilt step.
Figure 12B:
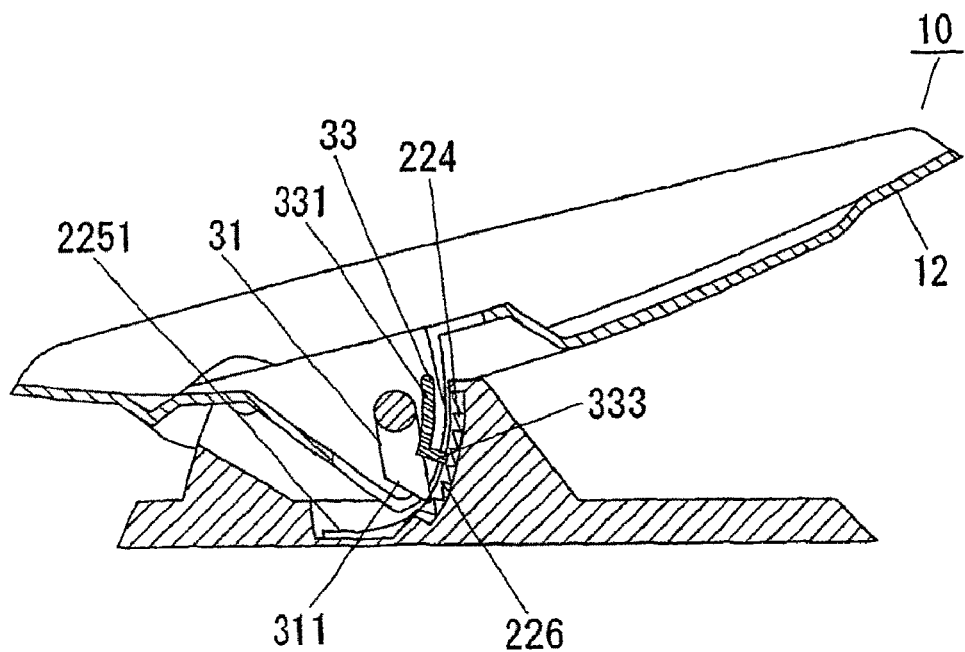
Figure 13A:
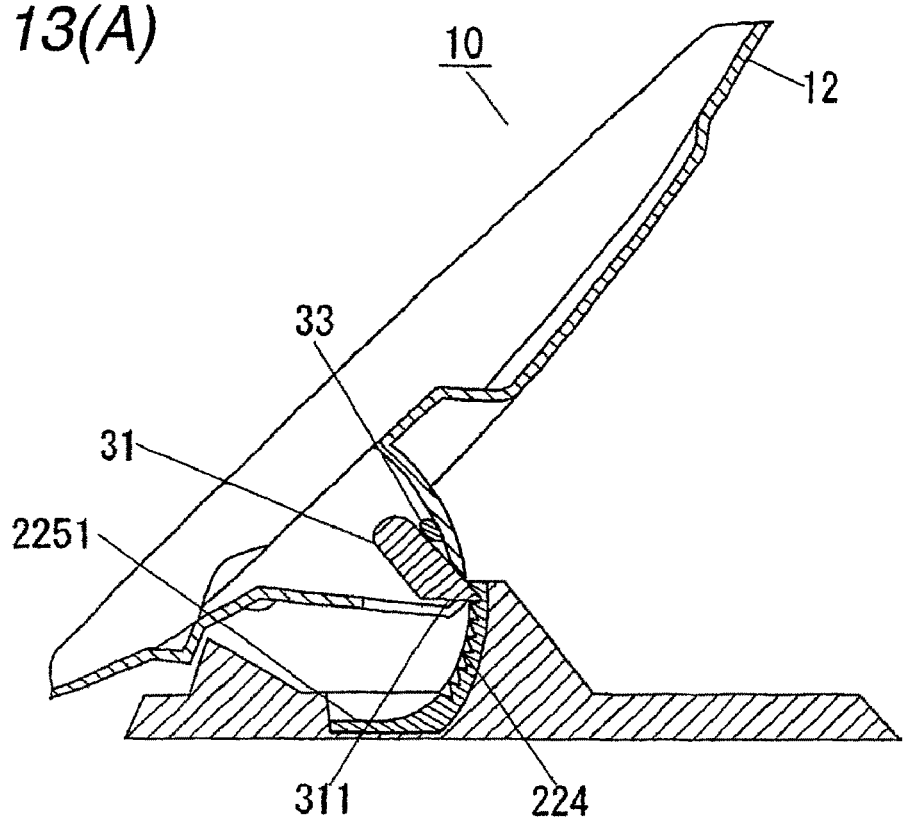
FIGS. 13(A) and 13(B) are sectional diagrams showing the uppermost tilt step.
Figure 13B:
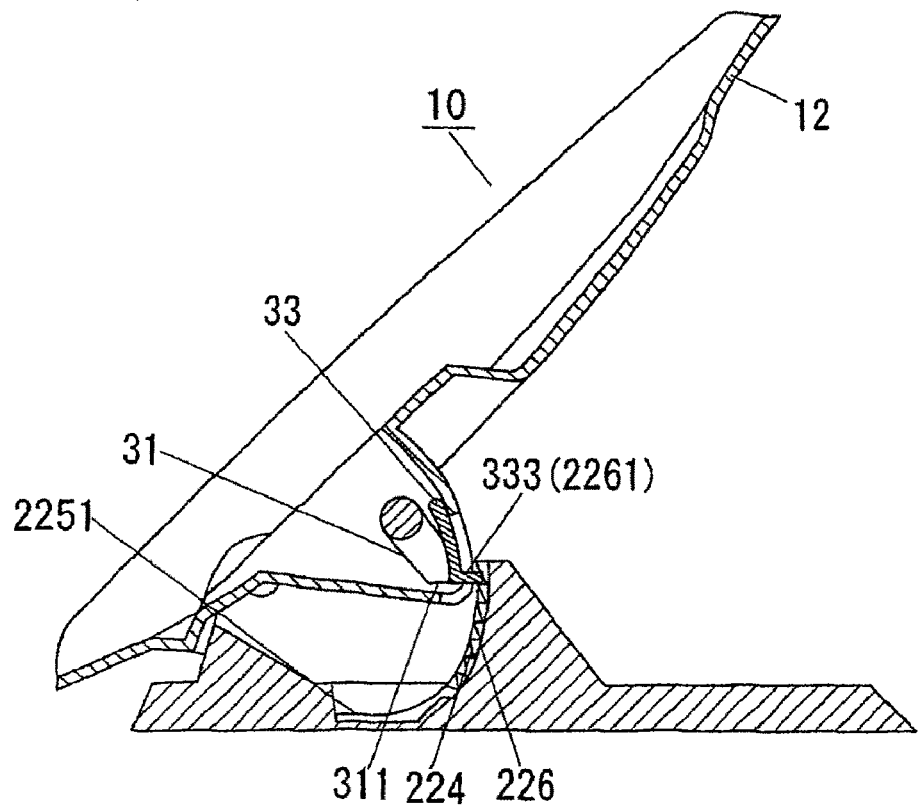
Figure 14A:
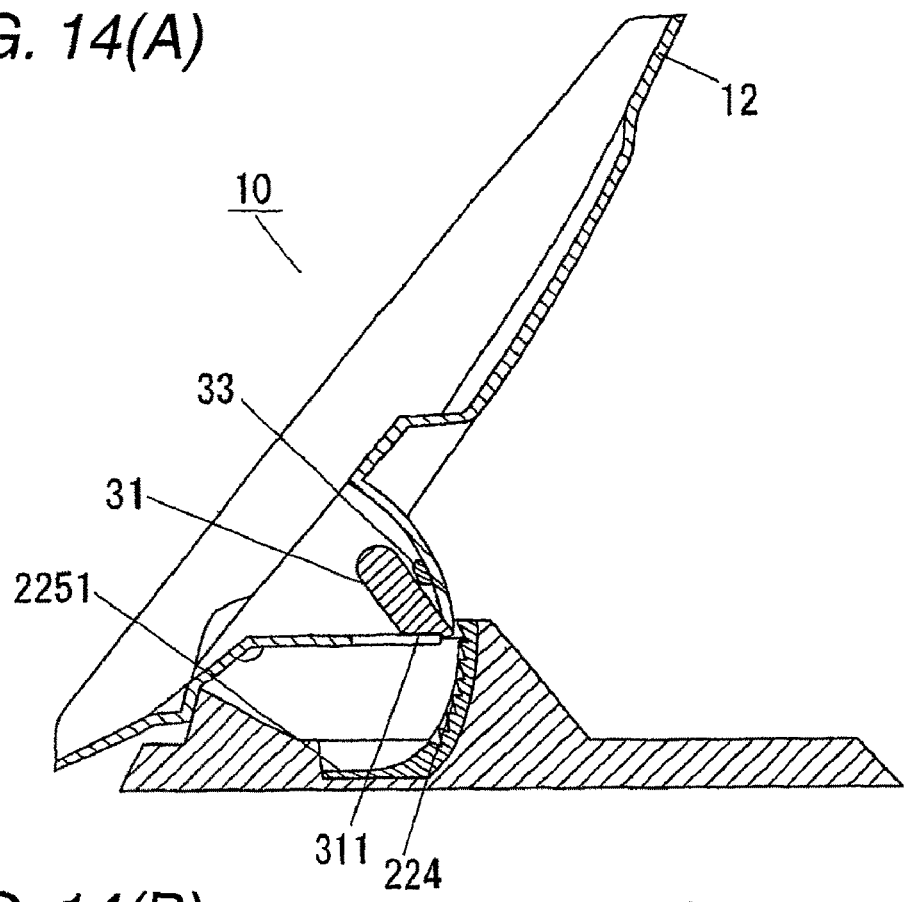
FIGS. 14(A) and 14(B) are sectional diagrams showing a tilt release position.
Figure 14B:
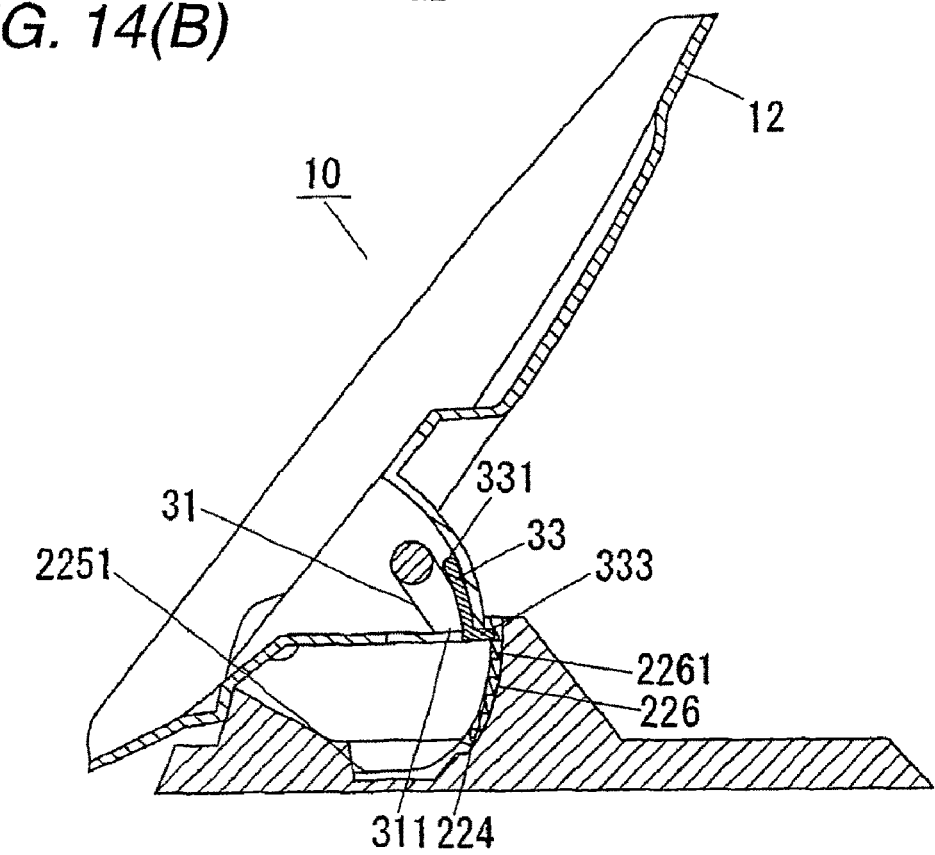

FIG. 12 is sectional diagrams showing the lowermost tilt step, wherein FIG. 12(A) is a diagram showing the position of the hook and FIG. 12(B) is a diagram showing the position of the cam. FIG. 13 is sectional diagrams showing the uppermost tilt step, wherein FIG. 13 (A) is a diagram showing the position of the hook and FIG. 13(B) is a diagram showing the position of the cam. FIG. 14 is sectional diagrams showing the tilt release position, wherein FIG. 14 (A) is a diagram showing the position of the hook and FIG. 14(B) is a diagram showing the position of the cam. FIG. 15 is a diagram for explaining a process rerunning from the tilt release position to the initial position.

As to the using state of the telephone apparatus 1, firstly the telephone apparatus 1 is placed on a table horizontally, which is referred as the initial state. In FIG. 11, when the main-body base portion 12 is placed horizontally as the initial position, the nail portion 311 of the hook 31 does not engage with the tooth row 244 but the nail portion 311 locates at the front edge of the curved surface 2251. Further, the cam engagement portion 333 of the cam 33 is placed in a state of being engaged with the lower engagement portion 2262. Thus, the cam 33 does not further move downward from the engaged position with the lower engagement portion 2262 (see a position F of FIG. 15).

An operator grasps the display portion 111 side or the left and right sides of the apparatus main body 10 (main-body base portion 12) and gradually tilts the apparatus main body in a manner of raising it. Thus, the main-body base portion 12 starts to tilt (swing) around the swingable shaft 124. Since the hook shaft 312 of the hook 31 is pivotally attached to the rotation hole 1222, the hook 31 starts to move while sliding the nail portion 311 along the curved surface 2251 (see the reverse and forward movement of the hook 31 from the position F to a position D of FIG. 15) in accordance with the tilting (swinging) of the main-body base portion 12. As described above, since the suitable abrasion exists between the main-body arc-shaped peripheral surface 1223 and the cam abutment portion 331, the cam 33 starts to move upward while sliding the cam engagement portion 333 along the cam control groove 226 in accordance with the tilting (swinging) of the main-body base portion 12.

When the operation of FIG. 11 is continued, the main-body base portion reaches the lowermost tilt step shown in FIG. 12. In FIG. 12, the nail portion 311 of the hook 31 engages with the first tooth (the tooth of the lowermost step) of the tooth row 224. Thus, this step is referred as the lowermost tilt step and the tilt angle in this case is referred as a minimum tilt position. Since the hook 31 is pushed and biased toward the tooth row 224 by the torsion coil spring 32, the nail portion 311 is kept in the engagement state with the tooth row 224 even if an operator pushes down or stops raising the main-body base portion 12. As a result, the apparatus main body 10 keeps the tilting at the initial position.

An intermediate position from FIG. 12 to FIG. 13 represents an adjusting range where the tilt angle can be set freely. When an operator further raises the main-body base portion 12, the hook 31 is raised in accordance with the rising of the rotation hole 1222 together with the tilting of the main-body base portion 12. The nail portion 311 of the hook 31 rises while sliding along the slanted surfaces of the sawteeth of the tooth row 224 and riding on the teeth. The cam 33 starts rising while sliding the cam engagement portion 333 along the cam control groove 226 due to the abrasion with the main-body arc-shaped peripheral surface 1223.

When an operator tilts the main-body base portion 12 to the desired tilt angle, the operator stops the raising. Since the nail portion 311 of the hook 31 is pushed and biased toward the tooth row 224 by the torsion coil spring 32, when the nail portion moves over the tip portion of the sawtooth, the nail portion engages with the horizontal plane of the tooth at this position. When the nail portion locates on the way of the slanted surface of the sawtooth of the tooth row 224, the nail portion 311 moves down along the slanted surface of the tooth and reaches the horizontal plane of the tooth of the lower step and engages with the tooth of the lower step.

When the tilt angle of the apparatus main body 10 increases, the apparatus main body reaches the uppermost tilt step shown in FIG. 13. In FIG. 13, the hook 31 engages with the tooth of the uppermost step of the tooth row 224. Thus, this step is referred as the uppermost tilt step and the tilt angle in this case is referred as a maximum tilt position. The pressing and biasing against the hook 31 functions in the same manner as described above. The cam 33 rises while sliding the cam engagement portion 333 along the cam control groove 226 due to the abrasion with the main-body arc-shaped peripheral surface 1223 and so the cam engagement portion 333 moves near the upper engagement portion 2261.

Since the hook 31 engages with the tooth at the desired position of the tooth row 224, the operation panel portion 11 can be set to an optimum tilt angle. The tile angle of the main-body base portion 12 can be adjusted finely in accordance with the set number of the teeth (that is, divided step number) of the tooth row 224 from the lowermost tilt step (minimum tilt position) shown in FIG. 12 to the uppermost tilt step (maximum tilt position) shown in FIG. 13.

In the case where an operator desires to release the tilting state of the main-body base portion 12 or restore the main-body base portion to the horizontal position, the operator further raises the main-body base portion 12 to the tilt release position. The mode of the tilt release position will be explained with reference to FIGS. 14 and 15. When the main-body base portion 12 is raised to the tilt release position, the cam engagement portion 333 of the cam 33 engages with the upper engagement portion 2261 which is the cam movement upper limit point of the cam control groove 226 and so the cam 33 stops its movement (see FIG. 14(B) and FIG. 15(A)).

On the other hand, when the main-body base portion 12 is raised to the tilt release position, the hook 31 is raised due to the raising movement of the rotation hole 1222. In this case, the hook abutment portion 313 of the hook 31 abuts against the cam abutment portion 331 of the cam 33 thus stopped and so the hook 31 rides on the cam 33. When the hook 31 rides on the cam 33, the hook 31 rotates around the hook shaft 312 (see an arrow D in FIG. 15(B)) against the pushing and biasing force of the torsion coil spring 32, and so the nail portion 311 rotates in the arrow D direction and separates from the tooth row 224. Since the nail portion 311 separates from the tooth row 224, this is referred as the tilt release position.

As described above, when the operation panel portion 11 is tilted so as to exceed the uppermost tile step, the operation panel portion reaches the tilt release position, whereby the tilting of the operation panel portion 11 can be released. Thus, an operator can adjust the tilt angle by merely tilting the apparatus main body 10 upward and so can easily perform this operation by one hand.

When the main-body base portion reaches the tilt release position explained in FIG. 14 and FIG. 15(B), an operator stops the raising operation of the main-body base portion 12 thereby to reduce the tilt angle of the main-body base portion 12. Since the hook 31 is pushed and biased toward the cam 33, the hook 31 maintains a state that the nail portion 311 rides on the cam 33. In this manner, the nail portion 311 of the hook 31 moves downward while the nail portion 311 maintains the position separated from the tooth row 224 (see FIG. 15(B) to FIG. 15(D)).

As described above, since the suitable abrasion exists between the main-body arc-shaped peripheral surface 1223 and the cam abutment portion 331, the cam engagement portion 333 of the cam 33 slidably moves downward along the cam control groove 226 in accordance with the downward movement (decrease of the tilt angle) of the main-body base portion 12. In this manner, the main-body base portion 12 continues to move downward without being interfered while the nail portion 311 of the hook 31 maintains the state being separated from the tooth row 224. The process where the main-body base portion 12 continues to move downward as describe above is shown from FIG. 15(B) to FIG. 15(D).

In FIG. 15(D), as explained above as to the initial position, since the cam control groove 226 is provided with the lower engagement portion 2262, the cam 33 having continued to move downward stops the downward movement when the cam engagement portion 333 engages with the lower engagement portion 2262.

On the other hand, since the hook 31 continues to move downward in accordance with the downward movement of the main-body base portion 12, the hook 31 cancels the riding state on the cam 33 in the stopped state and moves to a direction separating from the cam 33 (moving downward) (see FIG. 15(D)). In this case, the nail portion 311 passes the lowermost step of the tooth row 224. As described above, since the curved surface 2251 is formed on the extended line of the envelope which contacts to the tops of the teeth of the tooth row 224, the hook 31 does not engage with the tooth row 224 even when the hook further moves downward from the tooth row 224.

The hook 31 rotates to an arrow E direction (see FIG. 5(E)) in a manner that the nail portion 311 of the hook 31 slidably moves on the curved surface 2251 (see FIG. 15(D) to FIG. 15(E)). An operator continues the downward movement of the main-body base portion 12 and stops the downward operation when the apparatus main body 10 restores to the horizontal state. The hook 31 continues the downward movement (rotation to the arrow E direction) and stops the downward movement when reaches the initial position shown in FIG. 15(F), whilst the cam 33 continues the stop state.

As explained in detail, according to the invention, the initial position represents a position where the hook 31 separates from the cam 33 on the way of the downward movement and the hook 31 restores to the position capable of engaging with the tooth of the lowermost step of the tooth row 224, whereby the main-body apparatus 10 restores to the position at which the angle becomes the minimum tilt angle with respect to the pedestal 20. According to the invention, the main-body apparatus 10 having moved downward is automatically set to have the minimum tilt angle.

Further, the hook 31, the torsion coil spring 32 as the biasing member of the hook 31 and the cam 33 are housed within the bottom space portion 121 and constitute the main-body ratchet unit. Furthermore, the pedestal arc-shaped peripheral surface 2211, the tooth row 224 and the cam control groove 226 are housed within the pedestal supporting portion 22 and constitute the pedestal ratchet unit. The main-body ratchet unit and the pedestal ratchet unit constitute the ratchet portion 30. Thus, since it is not required to provide a pillar for determining the tilt angle or an operation lever, a telephone terminal apparatus which has a simple appearance and the thin main body can be obtained.

The tilting of the apparatus main body 10 can be released by tilting the apparatus main body exceeding the uppermost step. By the operation of releasing the tilting, the apparatus main body 10 can be restored to the almost horizontal position with respect to the pedestal 20. When the apparatus main body is restored to the almost horizontal initial position, the tilt angle can be set again.

Accordion to the invention, an operator can adjust the angle by merely tilting the apparatus main body 10. The operation of the angle adjustment can be performed easily by one hand. An operator can perform both the tilt angle adjustment and the tilt angle release by raising a part of the main body.

The aforesaid explanation is made on condition that the initial position locates at the horizontal position further lower than the minimum tilt position. In this case, the number of the tooth of the tooth row 224 is increased to dispose a new tooth row 224 in the beneath direction. The minimum tilt position can be set as the initial position when the mutual positional relation is newly adjusted among the lower engagement portion 2262 of the cam control groove 226, the hook abutment portion and the cam abutment portion 331.

For example, it can be configured in a manner that, in FIG. 15(D), when the cam engagement portion 333 of the cam 33 engages with the lower engagement portion 2262 to stop the downward movement, the hook releases the riding state on the cam 33 like the hook 31 in FIG. 15(E), and so the nail portion 311 locates at the lowermost step of the tooth row 224. In this manner, the minimum tilt position can be set as the initial position.

According to the invention, the initial position represents a position where the hook separates from the cam at the position where the hook further moves downward from the lowermost step of the tooth row on the way of the downward movement, whereby the main body restores to the position at which the main body almost becomes horizontal with respect to the pedestal.

According to this configuration, when the tilt is made gentle to set to the minimum tilt angle, the tilt angle can be set to the minimum tilt position. This operation can be performed easily by one hand. An operator can perform both the tilt angle adjustment and the tilt angle release by raising a part of the main body.

Thus, the main body having been lowered can be restored to the almost horizontal initial position. The main body can be set to the initial position suitable for hanging on a wall by attaching the pedestal to the wall surface.

Figure 16A:
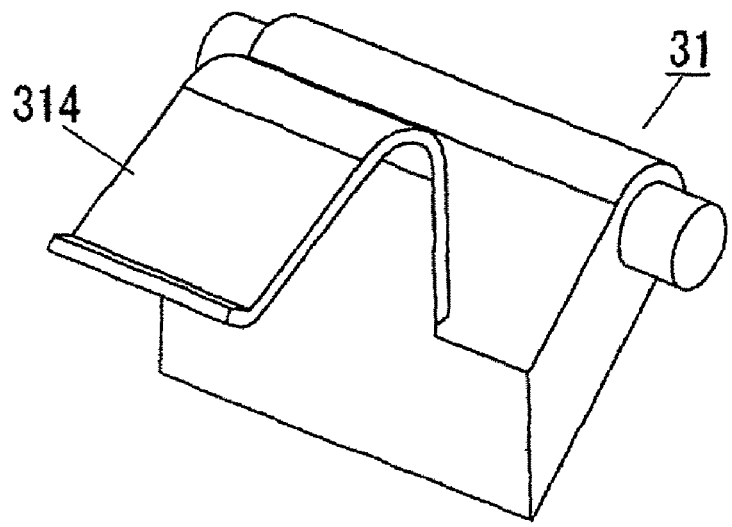
FIGS. 16(A) and 16(B) are diagrams showing another example relating to the hook and a bias member.

FIG. 16 is diagrams showing another example relating to the hook and the bias member, in which a leaf spring is used as the bias member in place of the torsion coil spring 32. FIG. 16(A) is a perspective view of the another hook which is arranged in a manner that a part of the hook 31 formed by an elastic resin member is extended and a leaf spring 314 formed in a U-shape is integrally formed with the hook 31.

Figure 16B:
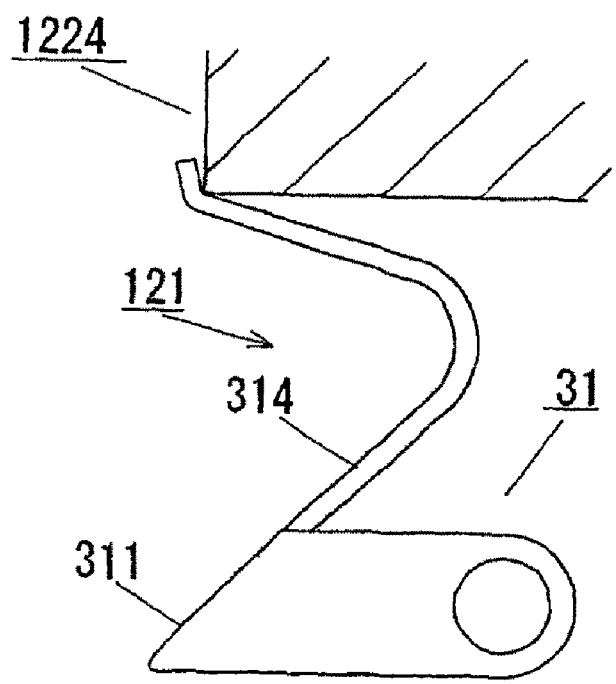

FIG. 16(B) is a diagram for explaining the mounting state of the another hook and shows a mounting state where the tip end portion of the leaf spring 314 is hung to the opening edge portion of the bottom space portion 121 (for example, the edge portion of the projection hole 1224). The U-shaped portion of the leaf spring 314 attains the elastic function of the elastic resin member and so can push and bias the nail portion 311 of the hook 31 toward the tooth row 224. Since the leaf spring 314 is integrally formed with the hook 31, the number of parts can be reduced and so the apparatus can be configured cheaply.

The aforesaid explanation is made as to the example where the single ratchet portion 30 is provided at the center portion. However, the invention is not limited thereto and the plurality of the ratchet portions 30 may be provided in accordance with the weight or the area of the bottom surface of the apparatus main body 10. In this case, the intensity and durability of the main-body bearing portion 123, the swingable shaft 124 and the bearing portion 2222 is enhanced and so the stable tilting operation can be secured.

(Second Embodiment)

Figure 17:
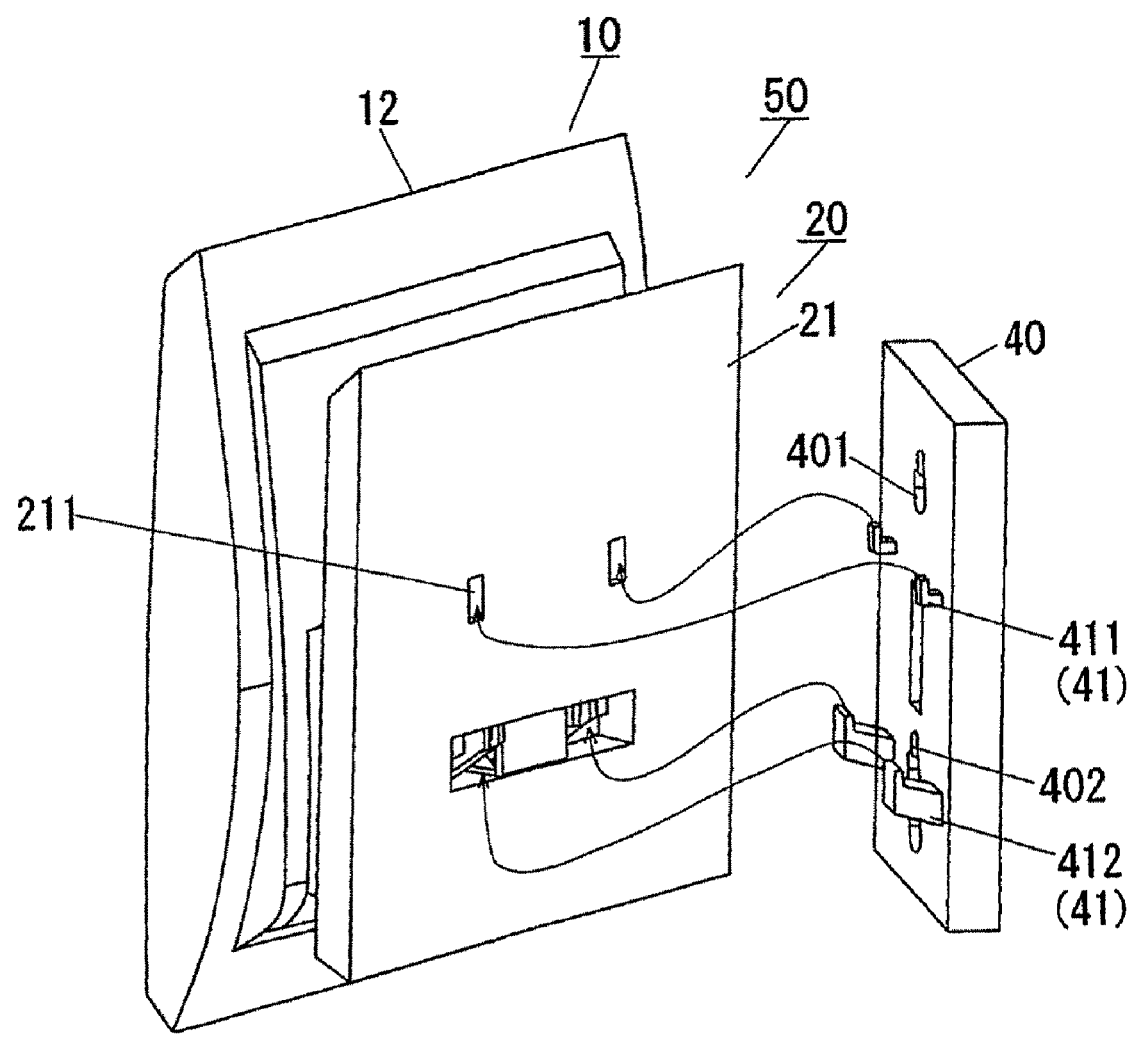
FIG. 17 is an exploded perspective view of the telephone apparatus used by being hung on a wall according to the second embodiment of the invention.
Figure 18:
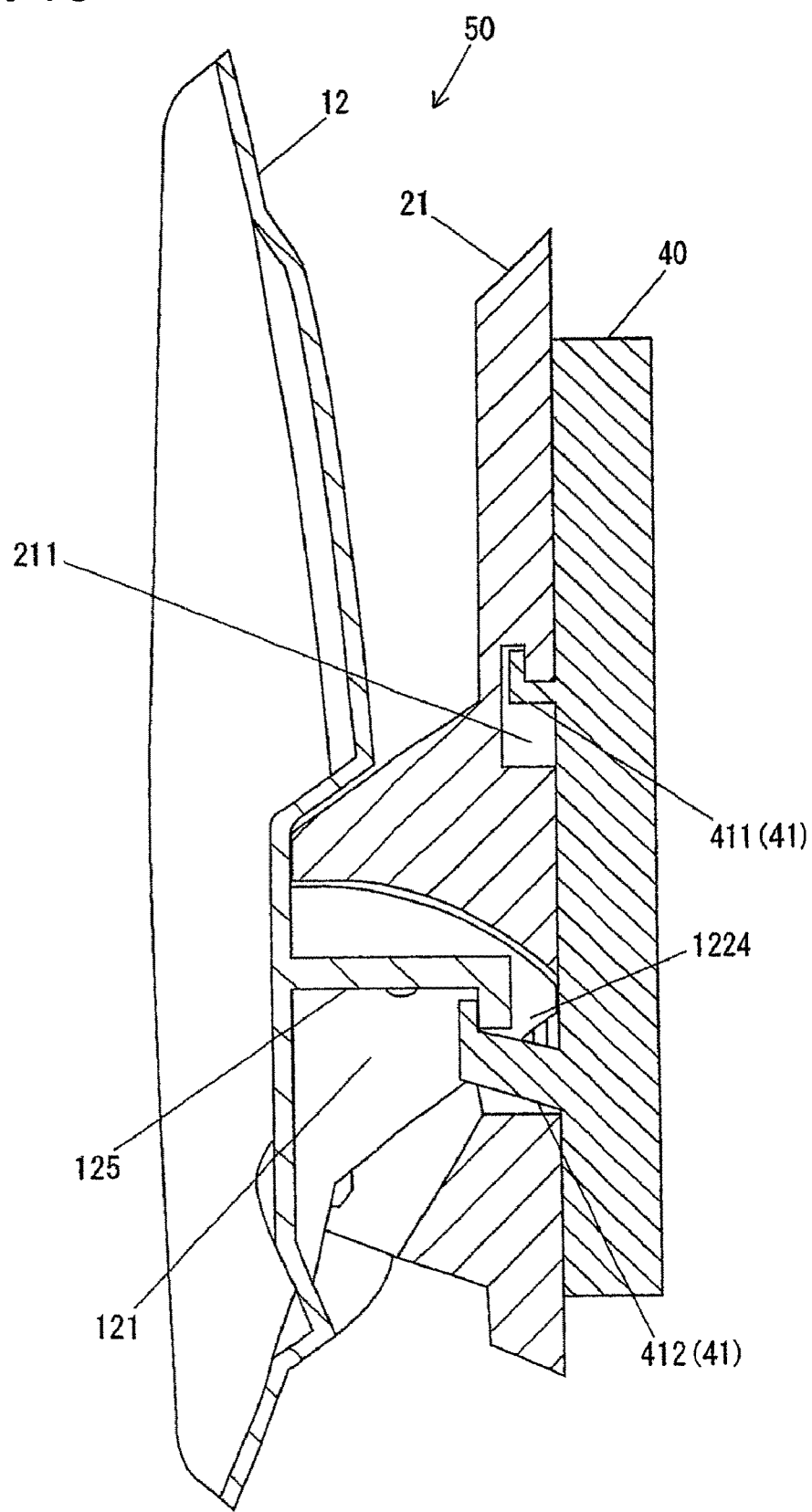
FIG. 18 is a sectional diagram showing a state where the telephone apparatus of FIG. 17 is attached.
Figure 19:
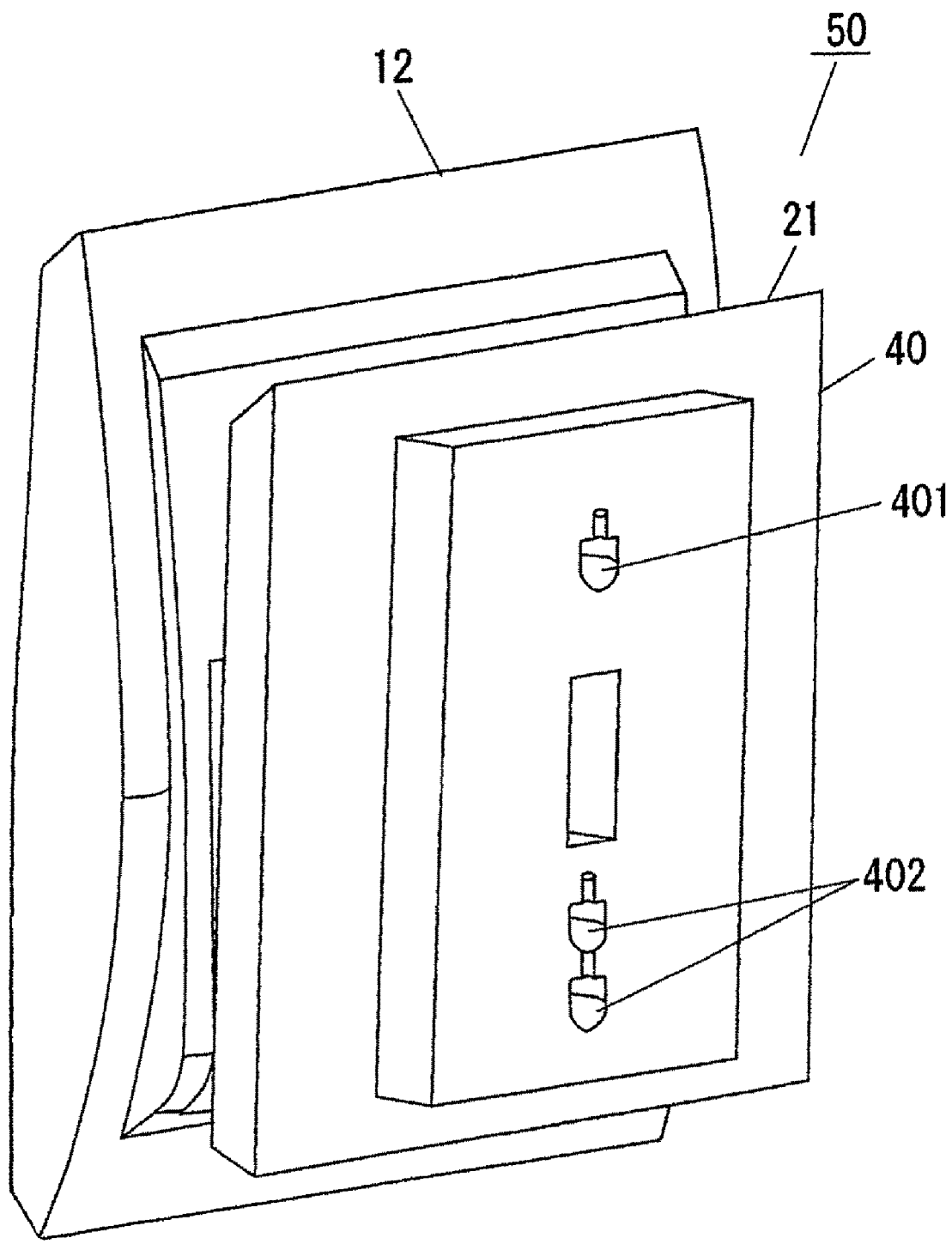
FIG. 19 is a rear perspective view showing a state where the telephone apparatus of FIG. 17 is attached.

The explanation will be made as to a telephone apparatus used by being hung on a wall according to the second embodiment of the invention. FIG. 17 is an exploded perspective view of the telephone apparatus used by being hung on a wall according to the second embodiment of the invention. FIG. 18 is a sectional diagram showing a state where the telephone apparatus of FIG. 17 is attached. FIG. 19 is a rear perspective view showing a state where the telephone apparatus of FIG. 17 is attached. In FIGS. 17 to 19, the constituent members not particularly explained are the same constituent members of the first embodiment and the members identical to those of the first embodiment are referred to by the common symbols, with explanation thereof being omitted.

The telephone apparatus 50 according to the second embodiment of the invention will be explained as to a case where the telephone apparatus is hung on a wall by using an attachment member 40. The attachment member 40 is molded by resin in a rectangular plate shape. First, an upper screw hole 401 and lower screw holes 402 are provided in order to fix the attachment member 40 to the wall surface. They are provided in order to insert screws therethrough and fix the attachment member to the wall. In particular, the two lower screw holes 402 are respectively provided at upper and lower positions so as to be able to select a distance between holes formed at the wall.

Further, the attachment member 40 is provided with a plurality of L-shaped wall-side engagement projections 41 which protrude from the attachment member 40 and are integrally molded with the attachment member. The wall-side engagement projection 41 has left and right upper-side engagement projections 411 and left and right lower-side engagement projections 412 each formed to be larger than the upper-side engagement projection 411.

In the telephone apparatus 50, a base portion 21 (corresponding to the pedestal 20 of the first embodiment) is provided with engagement holes 211 each having an L-shaped section. A main-body base portion 12 is provided with an engagement portion 125 of an L-shaped section which extends toward the projection hole 1224 of a bottom space portion 121. These members engage with the wall-side engagement projections 41 to realize the usage of being hung on a wall (usage in a vertical manner).

A method of attaching to the wall surface will be explained. First, in a state that screws are inserted into the upper screw hole 401 and the lower screw holes 402, the screws are screwed into the wall at predetermined position of the wall to fix the attachment member 40.

The telephone apparatus 50 is placed in the initial state explained in the first embodiment. The telephone apparatus 50, in which the main-body base portion 12 is placed in the horizontal state (state of the initial position), is carried to the position of the attachment member 40 in a manner that the telephone apparatus is grasped so as to close between the apparatus main body 10 and the base portion 21 (pedestal 20) in order not to change the tilt angle of the apparatus main body 10.

The upper-side engagement projections 411 and the lower-side engagement projection 412 of the attachment member 40 are engaged with the engagement holes 211 and the engagement portion 125, respectively. The engagement is performed in a manner that after the upper-side engagement projections 411 are aligned to the engagement holes 211, the lower-side engagement projection 412 is inserted, and the then the base portion 21 (pedestal 20) is pulled down, whereby the hook portions of the tip ends of the projections (411, 412) can be engaged with the hook portions of the upper portions of the engagement holes 211 and the engagement portion 125, respectively.

In this case, since the lower-side engagement projection 412 engages with the engagement portion 125, the operation for the tilt angle (state of the initial position) of the apparatus main body 10 is fixed. The apparatus main body 10 having been in the horizontal state become in a vertical state and the tilting of the apparatus main body 10 is restricted. In this manner, the telephone apparatus 50 can be attached to the wall while maintaining the position relation between the main-body base portion 12 and the base portion 21 (pedestal 20) to the initial position.

In this manner, when the main-body base portion 12 is engaged with the base portion 21 by the attachment member 40, the tilting operation of the main-body base portion 12 can be fixed. The usage of being hung on a wall (usage in a vertical manner) of the telephone apparatus 50 can be realized when an operator merely engages the telephone apparatus 50 at the initial position (usage in the horizontal state) with the base portion 21. In addition, the usage range of the telephone apparatus 50 can be broadened.

According to the invention, since the operation panel portion can be set easily to the desired tilt, the invention is preferable for a terminal apparatus which operability is improved in order that the terminal is disposed on a table or a wall thereby to see the display and operate.

The embodiments of the invention are explained as to a telephone apparatus as an example. However, it should be understood that the invention is not limited to the telephone apparatus and, of course, the contents of the invention can be widely utilized to a terminal apparatus which operability is improved in order that the terminal apparatus is disposed on a table or a wall and a person views and operates the apparatus.

This application is based upon and claims the benefit of priority of Japanese Patent Application No. 2006-258556, filed on Sep. 25, 2006, the contents of which are incorporated herein by reference entirety.

The invention claimed is:

1. A terminal apparatus, comprising:
a main body having an operation portion;
a pedestal which holds the main body so as to be tiltable;
a hook which fixes the main body to the pedestal in a tilting state at plural predetermined angles;
a tooth row which has teeth and engages with the hook to fix the main body to the pedestal in a tilting state at plural predetermined angles; and
a cam which moves in accordance with a tilt angle of the main body;
wherein in response to movement of the hook over an end tooth of the tooth row, the hook rides on the cam thereby to release an engagement with the tooth row, and thereafter, in response to movement of the hook toward a start tooth of the tooth row, the hook moves out of a state of riding on the cam and the main body moves to restore to an initial position with respect to the pedestal, and
wherein the initial position represents a position where the hook separates from the cam and the hook restores to a position capable of engaging with a tooth of a start step of the tooth row, whereby the main body restores to a position at which an angle of the main body becomes a minimum tilt angle with respect to the pedestal.

2. A terminal apparatus, comprising:
a main body having an operation portion;
a pedestal which holds the main body so as to be tiltable;
a hook which fixes the main body to the pedestal in a tilting state at plural predetermined angles;
a tooth row which has teeth and engages with the hook to fix the main body to the pedestal in a tilting state at plural predetermined angles; and
a cam which moves in accordance with a tilt angle of the main body;
wherein in response to movement of the hook over an end tooth of the tooth row, the hook rides on the cam thereby to release an engagement with the tooth row, and thereafter, in response to movement of the hook toward a start tooth of the tooth row, the hook moves out of a state of riding on the cam and the main body moves to restore to an initial position with respect to the pedestal, and
wherein the initial position represents a position where the hook separates from the cam at a position where the hook further moves downward from a start step of the tooth row, whereby the main body restores to a position at which the main body almost becomes horizontal with respect to the pedestal.

3. A terminal apparatus, comprising:
a main body having an operation portion;
a pedestal which holds the main body so as to be tiltable;
a hook which is provided on the main body side and fixes the main body to the pedestal in a tilting state at plural predetermined angles;
a tooth row which is provided on the pedestal side, has teeth and engages with the hook to fix the main body to the pedestal in a tilting state at plural predetermined angles;
a cam which is provided on the main body side and moves within the main body in accordance with a tilt angle of the main body;
a biasing member which pushes and biases the hook toward the tooth row; and
a cam control groove which is provided in parallel to the tooth row and along which the cam moves,
wherein in response to the main body being tilted so as to exceed the predetermined angle, the cam engages with the cam control groove to stop an upward movement according to the tilting of the main body, then the hook moves over the cam in a stopped state to release the engagement with the tooth row, the hook moves down along the cam control groove together with the cam in a state of riding on the cam by the biasing member, whereby the main body releases a tilting state and moves downward to restore to an initial position with respect to the pedestal, and
wherein the initial position represents a position where the cam engages with the cam control groove on a way of a downward movement thereof to stop the downward movement according to release of the tilting of the main body, then the hook continues to move downward according to the downward movement of the main body and separates from the cam, and then the cam restores to a position capable of engaging with a tooth of a lowermost step of the tooth row by the biasing member, whereby the main body restores to a position having a minimum tilt angle with respect to the pedestal.

4. A terminal apparatus, comprising:
a main body having an operation portion;
a pedestal which holds the main body so as to be tiltable;
a hook which is provided on the main body side and fixes the main body to the pedestal in a tilting state at plural predetermined angles;

a tooth row which is provided on the pedestal side, has teeth and engages with the hook to fix the main body to the pedestal in a tilting state at plural predetermined angles;

a cam which is provided on the main body side and moves within the main body in accordance with a tilt angle of the main body;

a biasing member which pushes and biases the hook toward the tooth row; and a cam control groove which is provided in parallel to the tooth row and along which the cam moves, wherein in response to the main body being tilted so as to exceed the predetermined angle, the cam engages with the cam control groove to stop an upward movement according to of the main bod then the hook moves over the cam in a ed state to release the the tiltin engagement with the tooth row, the hook moves down along the cam control groove together with the cam in a state of riding on the cam by the biasing member, whereby the main body releases a tilting state and moves downward to restore to an initial position with respect to the pedestal, and wherein the initial position represents a position where the cam engages with the cam control groove on a way of a downward movement thereof to stop the downward movement according to release of the tilting of the main body, then the hook continues to move downward according to the downward movement of the main body and separates from the cam, and then the cam restores to a position exceeding a lowermost step of the tooth row by the biasing member, whereby the main body restores to a position almost horizontal with respect to the pedestal.

5. A terminal apparatus according to claim 3, wherein the tooth row has teeth each formed in a sawtooth shape, the main body is tilted and fixed at the plural predetermined angles which are tilt angles determined based on the teeth by engaging the hook with the respective teeth, respectively, and the main body is set at a maximum tilt angle when the hook engages with an uppermost step of the tooth row and set at a minimum tilt angle when the hook engages with a lowermost step of the tooth row.

6. A terminal apparatus according to claim 3, wherein the hook includes a nail portion engaging with the tooth row, a hook shaft supported by the main body and an abutment portion abutting against the cam, and the nail portion is configured to protrude toward the tooth row from the main body.

7. A terminal apparatus according to claim 3, wherein the cam includes an abutment portion abutting against the hook and an engagement potion which engages with the cam control groove to stop the movement.

8. A terminal apparatus according to claim 1, further comprising a cam control groove which is provided in parallel to the tooth row and along which the cam moves.

9. A terminal apparatus according to claim 1, wherein said hook is provided on the main body side, said tooth row is provided on the pedestal side, and said cam is provided on the main body side.

10. A terminal apparatus according to claim 1, wherein:

the hook is provided on the main body, the tooth row is provided on the pedestal, the cam holds the main body and moves within the main body, the end tooth is at an end step of the tooth row, and when the hook moves over the tooth at the end step of the tooth row, the hook rides on the cam thereby to release the engagement with the tooth row, then the hook moves downward in states of riding on the cam, then the main body releases the tilting state and moves downward to restore to the initial position with respect to the pedestal.

11. A terminal apparatus according to claim 10, further comprising a cam control groove which is provided in parallel to the tooth row and along which the cam moves.

* * * * *